United States Patent [19]
Newman et al.

[11] Patent Number: 5,420,441
[45] Date of Patent: May 30, 1995

[54] AUTOMATED TECHNIQUE FOR CALIBRATING A STORAGE PHOSPHOR READER

[75] Inventors: J. Daniel Newman; Daniel K. McBride; James C. Montoro, all of Rochester, N.Y.

[73] Assignee: Eastman Kodak Company, Rochester, N.Y.

[21] Appl. No.: 156,606

[22] Filed: Nov. 23, 1993

[51] Int. Cl.⁶ .............................................. G03B 42/02
[52] U.S. Cl. ..................................... 250/581; 250/582; 250/587; 378/207
[58] Field of Search ................ 378/207; 250/587, 582, 250/581

[56] References Cited

U.S. PATENT DOCUMENTS

| | | |
|---|---|---|
| Re. 31,847 | 3/1985 | Luckey . |
| 2,426,884 | 9/1947 | Kieffer .............................. 378/162 |
| 5,122,664 | 6/1992 | Ito et al. ............................ 250/583 |
| 5,151,592 | 9/1992 | Boutet et al. ...................... 250/228 |
| 5,191,621 | 3/1993 | Brok ................................... 382/1 |
| 5,336,880 | 8/1994 | Leclerc et al. ................. 250/214 VT |

OTHER PUBLICATIONS

*Photostimulable Phosphor System Acceptance Testing*, by J. Anthony Siebert, Ph.D.

Primary Examiner—Constantine Hannaher
Attorney, Agent, or Firm—William F. Noval

[57] ABSTRACT

An automated method for analyzing the photometric calibration and image quality performance characteristics of a high resolution storage phosphor reader. A custom fabricated, lead mask test target is secured to a storage phosphor and exposed using a standard medical x-ray source. A storage phosphor reader, to be calibrated, reads the exposed storage phosphor to produce a digital x-ray image. The digital x-ray image is analyzed by means of a computer algorithm which presents analytic results in text and graphical form to isolate reader problems and to quantify calibration status of the reader.

20 Claims, 33 Drawing Sheets

Test Target For The Storage Phosphor Reader

Exposure Linearity & Signal To Noise Ratio

|  | Log Avg | Log Var | S/N Ratio |
|---|---|---|---|
| Density 1 | 3188 | 21.51 | 95.06 |
| Density 2 | 2942 | 26.92 | 84.08 |
| Density 3 | 2750 | 34.59 | 73.74 |
| Density 4 | 2590 | 41.85 | 67.29 |

Press 'G' Graph Data, 'P' To Print Table

Press <Enter>Key To Continue

*FIG. 7B*

FIG. 9A
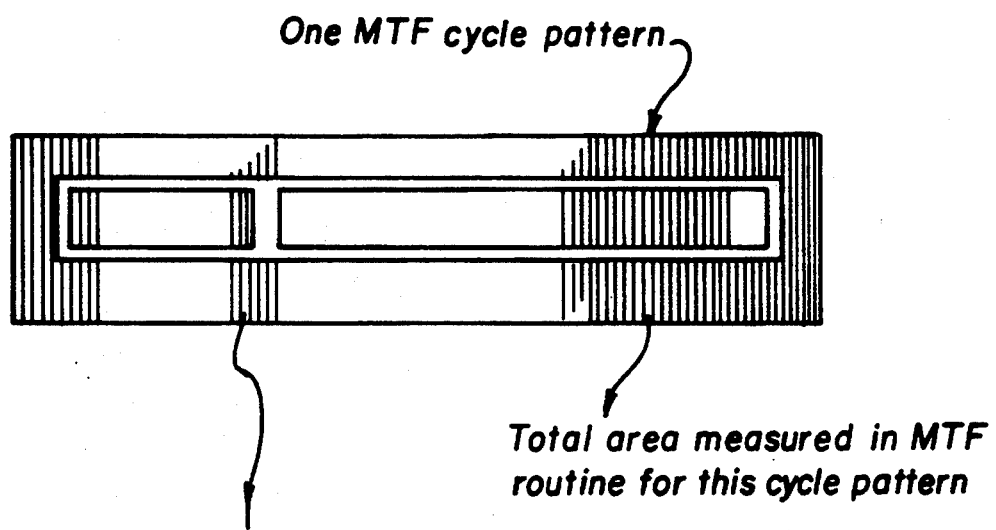
One MTF cycle pattern
Total area measured in MTF routine for this cycle pattern
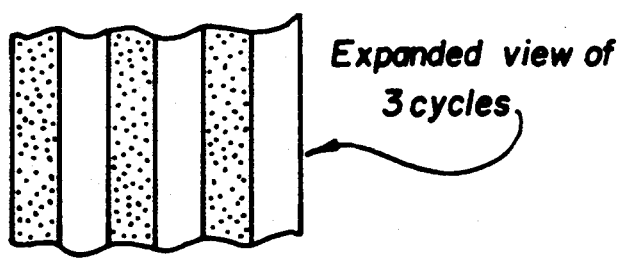
Expanded view of 3 cycles
FIG. 9B File Not Found!!

Image File Name: d:kespr

Press <Enter> Key To Continue

FIG. 13

Corner Point Coordinates

|             | X Coordinate | Y Coordinate |
|-------------|--------------|--------------|
| Upper Left  | 431          | 445          |
| Upper Right | 1535         | 445          |
| Lower Left  | 430          | 1945         |

Press <Enter> Key To Continue

FIG. 15

| Target Tilt | | |
|---|---|---|
| | Delta X | Delta Y | Degrees |
| X Axis | 1104 | 0 | 0.00000 |
| Y Axis | 1 | 1500 | 0.03820 |

Target Tilt Acceptable

Press <Enter> Key To Continue

FIG. 16

Calulating Exposure Latitude And S/N Ratios

FIG. 19

Exposure Linearity & Signal To Noise Ratio

|            | Log Avg | Log Var | S/N Ratio |
|------------|---------|---------|-----------|
| Density 1  | 3188    | 21.51   | 95.06     |
| Density 2  | 2942    | 26.92   | 84.08     |
| Density 3  | 2750    | 34.59   | 73.74     |
| Density 4  | 2590    | 41.85   | 67.29     |

Press 'G' Graph Data, 'P' To Print Table

Press <Enter> Key To Continue

FIG. 20

Flare

| Measured | Expected | Acceptable |
|---|---|---|
| 2.8120 % | 2.0000% | 3.0000% |

Flare

Press 'P' To Print, <Enter> Key To Continue.

FIG. 23

Modulation Transfer Coefficients

|              | Top Horiz. | Bottom Horiz. | Vertical | Expected |
|--------------|------------|---------------|----------|----------|
| 0.5 Lines/mm |            | 0.81887       | 0.86614  | 0.87100  |
| 1 Lines/mm   | 0.58397    | 0.58113       | 0.57480  | 0.62800  |
| 2 Lines/mm   |            | 0.18491       | 0.20866  | 0.29700  |

Press 'G' Graph Data, 'P' To Print Table

Press <Enter> Key To Continue

FIG. 26

Electronic Noise Scan Power

AUTOMATED TECHNIQUE FOR CALIBRATING A STORAGE PHOSPHOR READER

FIELD OF INVENTION

This invention relates in general to storage phosphor imaging systems and more particularly to an automated technique for analyzing the photometric calibration and image quality performance characteristics of a high resolution storage phosphor reader.

BACKGROUND OF THE INVENTION

U.S. Patent No. Re. 31,847, reissued Mar. 12, 1985, to Luckey discloses a storage phosphor system in which a storage phosphor is exposed to an x-ray image of an object, such as the body part of a patient, to record a latent x-ray image in the storage phosphor. The latent x-ray image is read out by stimulating the storage phosphor with relatively long wavelength stimulating radiation such as red or infrared light produced by a helium neon gas laser or diode laser. Upon stimulation, the storage phosphor releases emitted radiation of an intermediate wavelength, such as blue light, in proportion to the quantity of x-rays that were received. To produce a signal useful in electronic image processing the storage phosphor is scanned in a raster pattern by a laser beam deflected by an oscillating or rotating scanning mirror or by a rotating hologon. The emitted radiation from the storage phosphor is reflected by a mirror light collector and detected by a photodetector, such as a photomultiplier, to produce an electronic x-ray image signal. Typically the storage phosphor is translated in a page scan direction past the laser beam which is repeatedly deflected in a line scan direction perpendicular to the page scan motion of the storage phosphor to form a scanning raster pattern of a matrix of pixels.

The x-ray image signal can then be viewed as a visual image produced by a softcopy display device, such as a video display (CRT, LCD) or a hardcopy display device, such as a x-ray film printer (laser printer, CRT printer, thermal printer).

A problem exists in providing an automated technique for analyzing the photometric calibration and image quality performance characteristics of a high resolution storage phosphor reader. It is desirable that such a technique yield a comprehensive and reliable assessment of the reader performance and be compatible for use in field (hospital) and manufacturing environments. It is also desirable that the technique provide analysis of the following.

1) Exposure latitude and photometric response linearity over the 10,000:1 dynamic range of the storage phosphor.
2) Signal to Noise Ratio over the effective exposure latitudes.
3) Spatial resolution (MTF).
4) Geometric scan linearity.
5) Banding artifacts due to mechanical vibration.
6) Electronic noise artifacts.
7) Flare artifact evaluation.

Item 3,4 and 5 are measured in both the slow (page) scan direction and the fast (line) scan direction.

Current methods of measuring photometry and image quality performance characteristics of a Storage Phosphor Reader [Computed Radiography (CR) Scanner] are based on analyzing the digitized data after it has been displayed on a separate output device. The most common method of image quality evaluation is a visual inspection of the digital output on a monitor (soft copy) or a digital laser film duplicate (hard copy). (See, for example, *Photostimulable Phosphor System Acceptance Testing*, by J. A. Siebert.) Visual inspections of this type are subjective and depend completely on the ability of an inspector to identify defects. In general, the analysis of the hard copy or soft copy output does not distinguish the calibration artifacts associated with the input device (scan engine) with those of the output device.

Problems therefore exist in current methods of CR image quality analysis. Such methods are, in general, non-analytic, time consuming and incapable of accurately measuring a number of important performance criteria such as spatial resolution, geometric linearity, banding noise power, signal to noise ratio, and excess scatter (or flare) artifacts.

SUMMARY OF THE INVENTION

According to the present invention, there is provided a solution to the problems of the prior art. The technique of the present invention overcomes the problem of secondary inspection by measuring the scanned image data before it has been moved to an output display device. The use of a calibrated template which is interpreted by a computer algorithm results in repeatable analytic results which are unique to the scan engine and cassette.

In one aspect of the invention, there is provided an automated method for analyzing the photometric calibration and image quality performance characteristics of a high resolution storage phosphor reader. The method yields a comprehensive and reliable assessment of the reader performance, and is compatible for use in field (hospital) and manufacturing environments. A custom fabricated test target has been designed for use as an "analog" reference input. The test target is a lead mask which is secured to a storage phosphor cassette, which is exposed using a standard medical x-ray source, and which is then digitized by the reader. A computer algorithm analyzes the digitized target image and provides analytic results in text and graphical form. The data is used both to isolate optical/mechanical problems in the storage phosphor reader and to quantify calibration status of the reader in an analytic and repeatable fashion.

According to another aspect of the present invention, there is provided an automated method for analyzing the photometric calibration and image quality performance characteristics of a storage phosphor reader comprising:

exposing to x-rays a storage phosphor through a lead mask test target having a plurality of calibrated density regions useful in analyzing x-ray image characteristics and storage phosphor reader characteristics;

reading said exposed storage phosphor by means of a storage phosphor reader to be calibrated, to produce a digital test target image; and digitally processing said digital test target image to produce analytical results of preselected x-ray image characteristics and storage phosphor reader characteristics.

DESCRIPTION OF THE DRAWINGS

FIGS. 7A and 7B are a respective graph and table showing signal-to-noise to exposure.

FIGS. 9A and 9B are graphical representation of the methodology used to measure the MTF of FIG. 8.

FIGS. 11–31 are screens displayed on a computer display monitor useful in describing the present invention.

DESCRIPTION OF THE PREFERRED EMBODIMENTS

Figure 1:
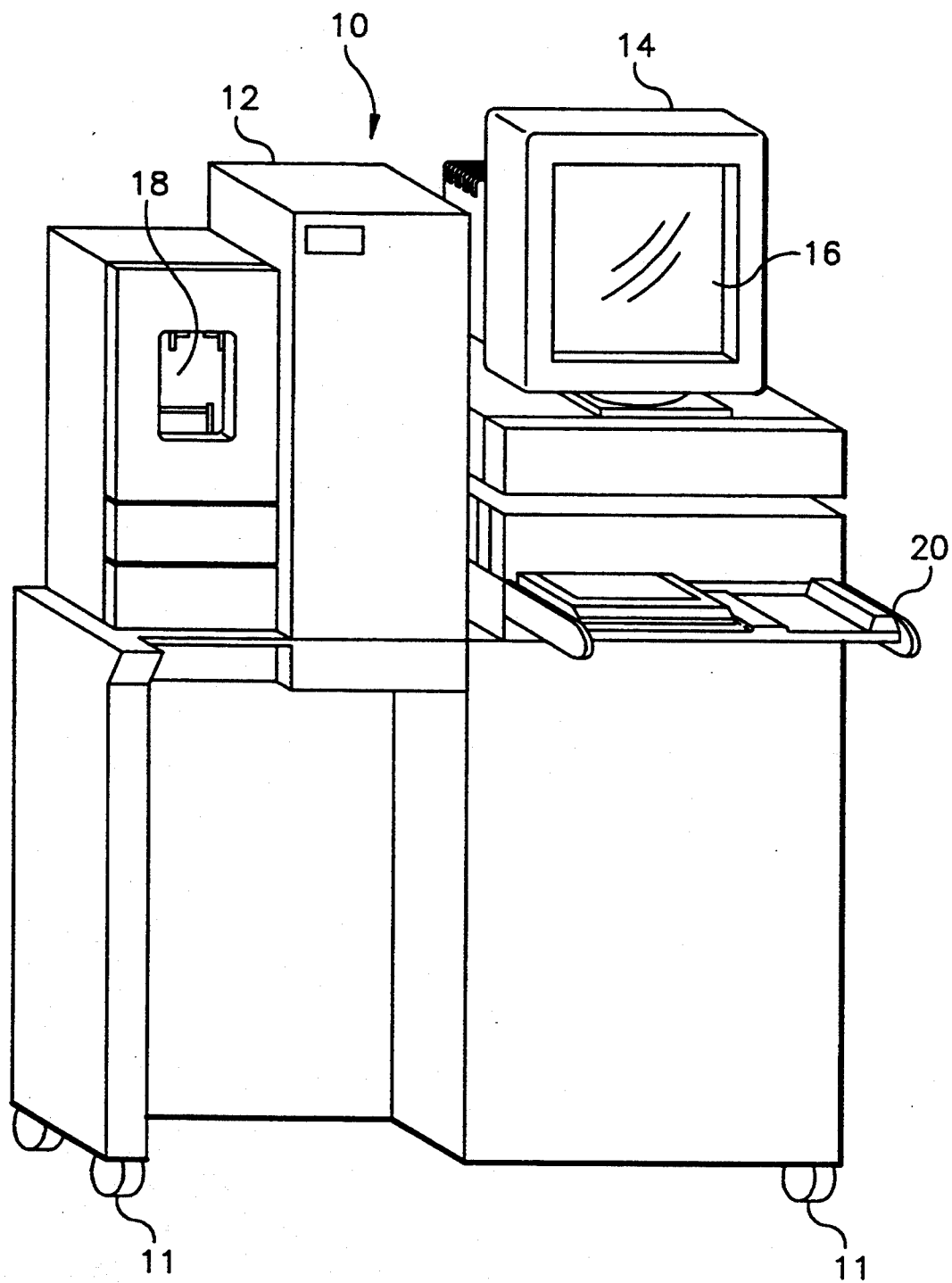
FIG. 1 is a perspective view of a storage phosphor reader.

Referring now to FIG. 1, there is shown a storage phosphor reader 10 incorporating an embodiment of the present invention. Reader 10 is mounted on casters 11 for easy portability in a radiology environment. Reader 10 includes a multiunit housing 12 housing the components of storage phosphor reader 10 and a video monitor 14 having a touch screen 16 supported on housing 12. Housing 12 also includes a bar code reader docking station 18 for docking a hand held bar code reader and for transferring data from the hand held bar code reader to storage phosphor reader 10. Reader 10 includes storage phosphor cassette load platform 20 which receives cassettes containing storage phosphor plates which are to be read or erased by reader 10.

In general, storage phosphor reader 10 processes images captured on a storage phosphor plate using conventional radiographic equipment. Reader 10 then scans the storage phosphor plate and converts the latent x-ray image therein into an electrical x-ray image signal which can be viewed on monitor 14. The scanned image is then delivered to a receiving device (such as a quality control station, laser printer or archival device) for image processing, image enhancement, viewing, printing and/or storage. The storage phosphor reader 10 is operated using touch screen 16 which also displays the image. The storage phosphor plates which are used to hold the unexposed x-ray images are mounted in standard size x-ray cassettes of different sizes. These storage phosphor plates can be erased and reused repeatedly. The optional hand held bar code reader can be used to collect exam information which is transferred to the storage phosphor reader 10 when it is mounted in station 18. The exam information is then associated with the scanned images.

In general, the storage phosphor reader is usable in the storage phosphor patient identification system disclosed in commonly assigned U.S. patent application Ser. No. 963,036, filed Oct. 19, 1992, inventor Good et al. As disclosed in that patent application, the storage phosphor patient identification system is as follows:

When a radiology technologist receives a request for an x-ray examination of a patient, the technologist exposes a body part of the patient to an x-ray which is stored as a latent x-ray image in the storage phosphor plate of a storage phosphor cassette. Several images may be taken at this time. Using the optional portable bar code reader the technologist scans the patient identification bar code label and the label on the storage phosphor cassette. Exam related information can be scanned from a bar code chart that is usually attached to the portable x-ray generator. Such information includes body part type, x-ray exposure conditions, position of patient and the like.

The image is now captured by the technologist performing the x-ray exam using the cassette containing the storage phosphor plate from which the bar code label was scanned. When the x-ray exam is complete the technologist takes the storage phosphor cassette to storage phosphor reader 10 to be processed. If the optional bar code reader is used, the technologist transfers the patient identification and exam information by inserting the bar code reader into the bar code reader station 18 on the front of reader 10. The scanned information is then transferred to the control system of the storage phosphor reader 10. The technologist then loads the cassette containing the exposed storage phosphor plate into reader 10 by loading on load platform 20. Scanning is initiated when the technologist presses a start button on touch screen 16.

Inside storage phosphor reader 10 the storage phosphor plate is extracted from the cassette and scanned with a laser light. As the plate is scanned, the image appears on touch screen 16 as it is being scanned. After the scanning is complete the image is sent to a receiving device where it can be tonescaled, enhanced, viewed, printed and/or stored. After the storage phosphor plate has been completely scanned it is erased by exposure to light which removes any remnants of the image. The storage phosphor reader 10 then places the storage phosphor plate back into its cassette. The technologist can now remove the cassette from reader 10 to be reused for another exam.

Figure 2:
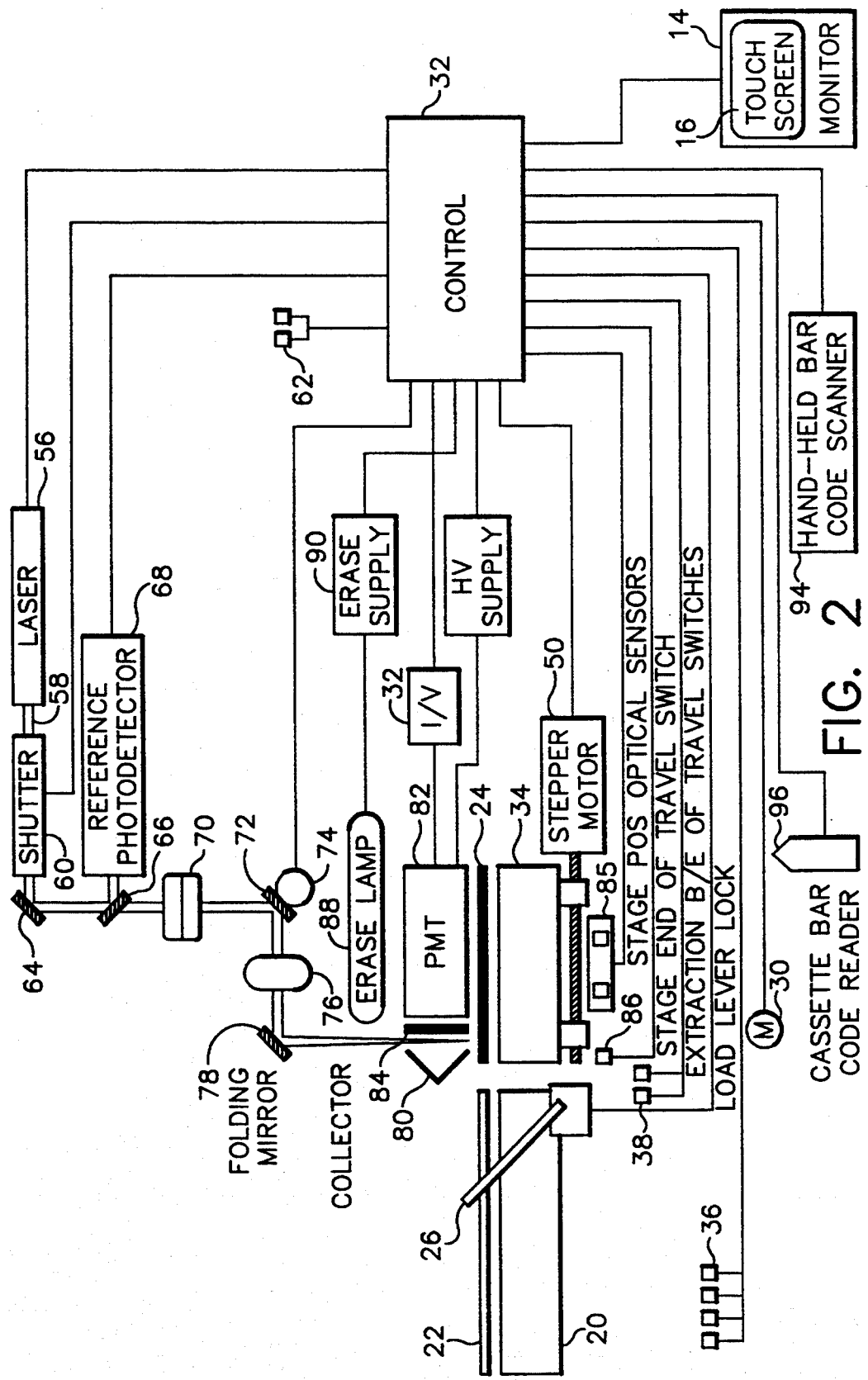
FIGS. 2 and 3 are respectively a partially diagrammatic, partially schematic view and a perspective view of the components of the storage phosphor reader of FIG. 1.
Figure 3:
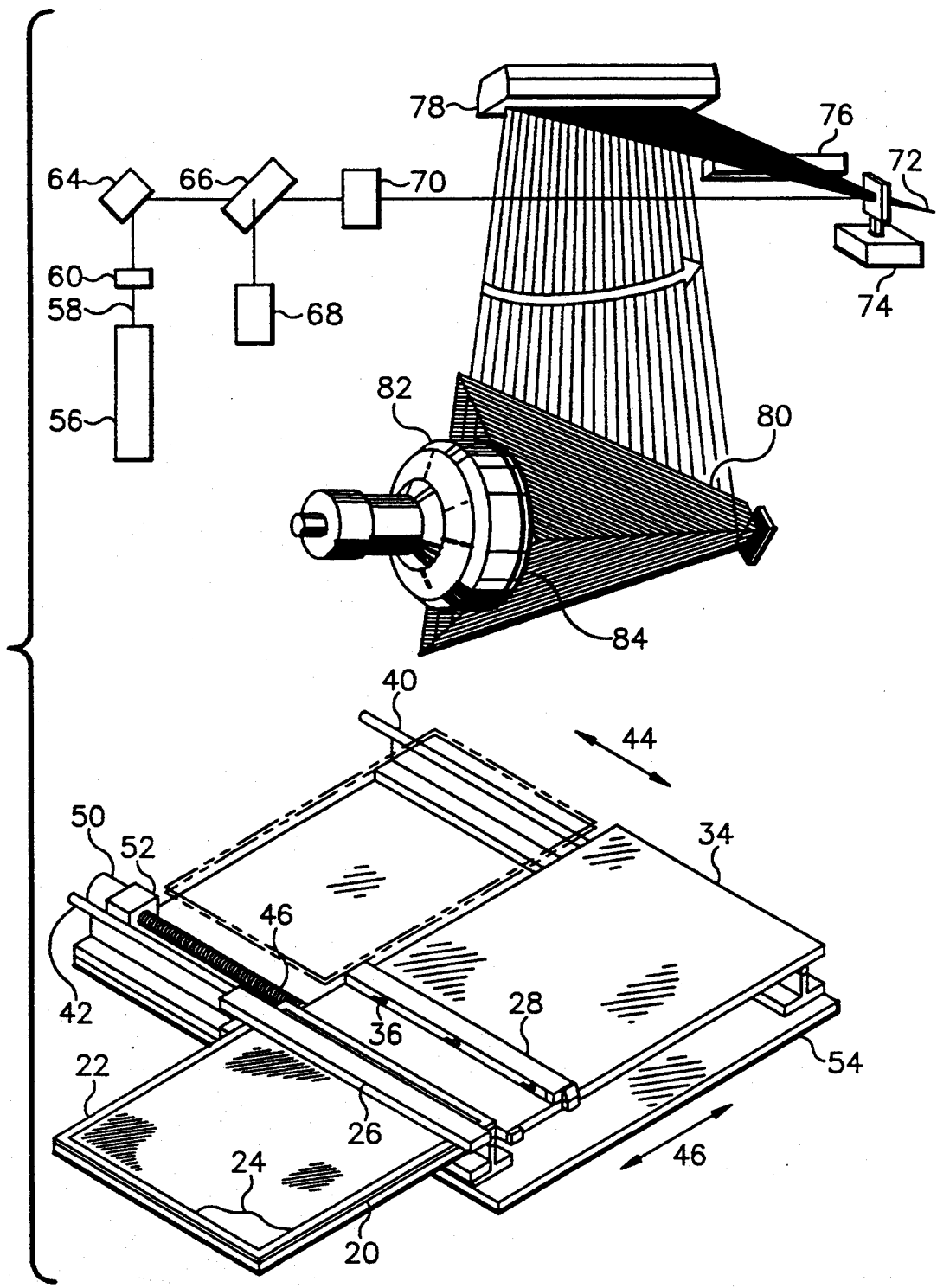

Referring now to FIGS. 2 and 3 storage phosphor reader 10 will now be described in greater detail. As shown, a storage phosphor cassette 22 containing a storage phosphor plate 24 is loaded on cassette load platform 20. Load lever 26 is rotated to clamp cassette 22 in place and to latch the cassette 22 to permit extraction of storage phosphor plate 24 therefrom. Storage phosphor plate 24 is extracted from cassette 22 by extraction device 28 (FIG. 3) which is actuated by extraction motor 30 under software control from control 32. Control 32 includes standard computer components such as a central processing unit (e.g., a microprocessor), a magnetic disk drive (for storing images, software applications and computer operating system), and input and output devices to communicate with the components of reader 10. Such computer systems are well known in the art and will not be described in detail herein.

Extraction device 28 is slidably mounted on translation stage 34 and includes hooks 36 which engage storage phosphor plate 24. Extraction device 28 extracts storage phosphor plate 24 from cassette 22 onto translation stage 34. As the storage phosphor plate 22 is loaded onto stage 34 it passes over plate size detecting switches 36 which detect the plate size and communicate this information to control 32. There are sufficient plate size detectors 36 to detect the different plate sizes that can be processed by reader 10. The beginning and end of travel of extraction mechanism 28 are sensed by extraction begin and end travel switches 38 connected to control 32.

Translation stage 34 is slidably mounted on rails 40 and 42 for movement in opposite directions 44 which are perpendicular to the directions 46 of loading and unloading of plate 24 relative to translation stage 34. Translation stage 34 is driven by a screw drive mechanism 48 actuated by stepper motor 50 mounted on block 52. Rails 40 and 42 are supported by frame member 54 of reader 10.

The laser scanning components will now be described. Reader 10 includes a laser 56 (such as a helium neon gas laser) for stimulation of storage phosphor plate 24. Laser 56 produces a laser beam 58 which passes through a shutter 60. Shutter 60 is controlled by digital signals received from control 32. Shutter 60 closes with activation of cover interlock switches 62 which detect closure of the housing 12 covers.

Beam 58 is reflected off mirror 64 and passes through beam splitter 66 which directs a portion of the laser beam 58 to reference photodetector 68. Following the beam splitter 66 laser beam 58 passes through collimator 70. The collimated laser beam is deflected by an oscillating scan mirror 72 driven by galvanometer 74 under the control of control 32. Scan mirror 72 provides the line scan raster motion of the laser beam 58. Galvanometer 74 drives mirror 72 with a constant angular velocity.

An f-theta lens 76 produces a flat field of focus and constant linear velocity at the plane of storage phosphor plate 24. Folding mirror 78 directs the laser beam through light collector 80 onto storage phosphor plate 24. Collector 80 may be of the type disclosed in commonly assigned U.S. Pat. No. 5,151,592, issued Sep. 29, 1992, inventors Boutet et al. The stimulating light of laser beam 58 causes the storage phosphor in plate 24 to emit light (blue) which is a function of the x-ray image stored in plate 24. Collector 80 directs this emitted light onto photomultiplier tube (PMT) 82. A filter 84 in front of the face of PMT 82 blocks the scattered stimulating laser light and passes the light emitted by storage phosphor plate 24.

Once a storage phosphor plate 24 is on translation stage 34 a scan is begun. Movement of translation stage 34 in the direction of arrow 44 is under software control of control 32. Control 32 sends commands to stepper motor 50 to initiate a scan, to start translation stage 34, to start galvanometer 74 and to turn on PMT 82. From the home position of stage 34, the control 32 counts stepper motor 50 steps to the point where the storage phosphor plate 24 is under collector 80. At this point acquisition of the latent x-ray image on storage phosphor plate 24 begins. At the end of the scan (determined by the number of scan lines for the appropriate storage phosphor plate size), PMT 82 and galvanometer 74 are turned off and translation stage 34 is returned to the home position. A stage end of travel switch 86 is located just beyond the position of optical sensors 85 to prevent damage in case of failure of optical sensors 85.

Immediately after translation stage 34 reaches the home position, erase lamp 88 is turned on by actuation of erase power supply 90 under software control from control 32. Following a predetermined erase time (such as 30 seconds), erase lamp 88 is turned off and extraction mechanism 28 returns storage phosphor plate 24 in the direction of arrow 46 to storage phosphor cassette 22. When the extraction mechanism 28 trips the extraction end of travel switch 38, the lock for load lever 26 is released. The storage phosphor reader user can now rotate load lever 26 and remove cassette 22 from loading platform 20.

During the scan of storage phosphor plate 24 an emitted x-ray light image is converted by PMT 82 into an x-ray electrical current signal. This signal is converted to a voltage by amplifier 92. As described in greater detail in commonly assigned U.S. patent application Ser. No. 965,657, filed Oct. 23, 1992, inventor S. Dhurjaty, entitled "Noise Reduction in a Storage Phosphor Data Acquisition System", laser noise which is present in the x-ray image signal produced by PMT 82 is corrected by subtracting a reference signal detected by reference photodetector 68. The corrected digital signal is corrected for the light collection signature of light collector 80 by a correction lookup table in control 32. The correction lookup table is loaded during calibration of reader 10 when it is initially set up.

Patient identification and examination information are downloaded into reader 10 from a hand held bar code scanner 94 positioned in station 18 of reader 10. As each storage phosphor plate 24 is extracted from its cassette 22 cassette bar code reader 96 reads the bar code on plate 24. The image data and corresponding patient and exam information are correlated by control 32.

As discussed above, a feature of this invention is to provide an inexpensive, automated and comprehensive method of analyzing the imaging performance characteristics of a storage phosphor reader in a manufacturing or field (hospital) environment. Imaging performance requirements for a diagnostic x-ray imaging tool, such as storage phosphor radiography, are extremely critical. Radiologists and physicians reading the storage phosphor radiography images need to be confident that the images they see are free of extraneous artifacts, do not exhibit excessive electronic (random) noise, have proper resolution, are true to scale geometrically, and have a linear optical response.

The procedure developed to perform this task is based on exposing (FIG. 6) a special test target (FIGS. 4 and 5), scanning the resulting test target storage phosphor radiography image, and analyzing the result with a computer algorithm. The diagnostic image quality performance of a storage phosphor reader can be directly inferred by analyzing the following performance attributes of the scanner.

1) Exposure latitude and linearity.
2) Detection signal to noise ratio over the standard exposure latitude.
3) Spatial resolution (MTF).
4) Geometric linearity of the scan.
5) Artifacts due to mechanical vibration.
6) Artifacts due to electronic noise.
7) Flare light artifacts.

Test Target

Figure 4:
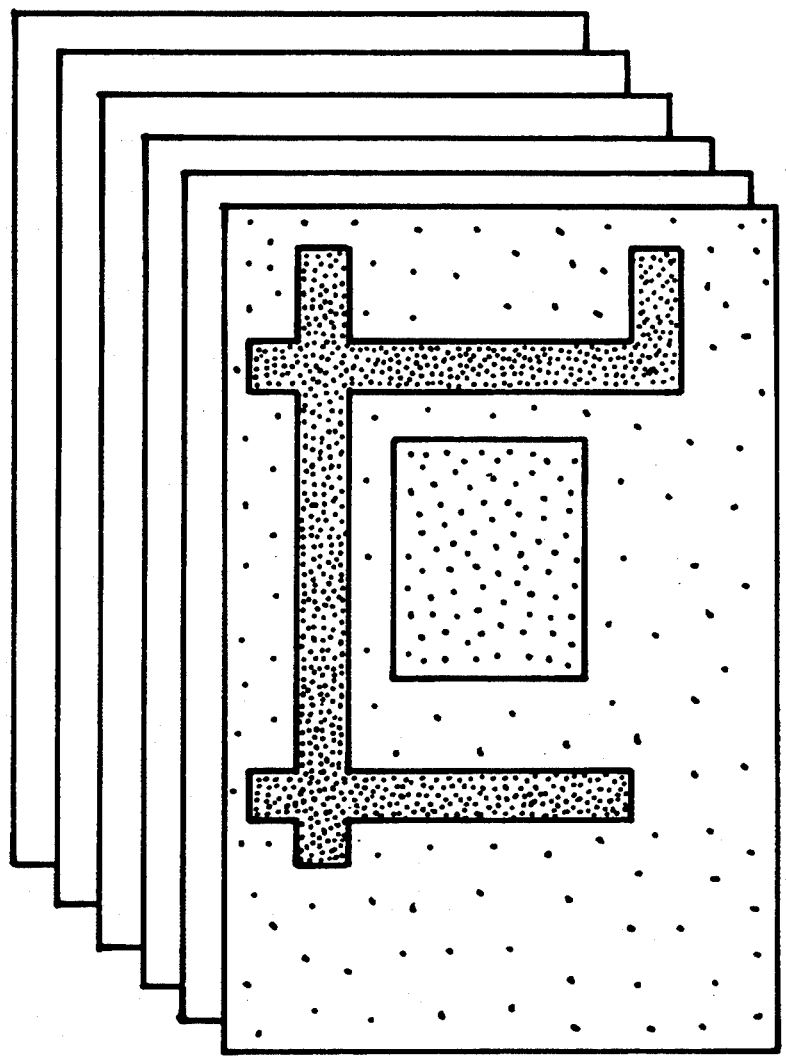
FIG. 4 is a diagrammatic perspective view of a test target for use in the present invention.

A key feature of this invention is the lead foil test target design and construction. The test target is generated by cascading six lead masks into a single "master" target as depicted in FIG. 4. For example, the lead masks are generated by a photoresist method which yields a lead masked region of 0.002 inch (0.05 millimeter) thickness with a 0.15 mm clear plastic backing for each layer. Each 0.05 mm in lead layer results in a roughly 30% x-ray modulation depth at typical operating conditions. After assembly, the composite mask is permanently secured between semirigid sheets of opaque plastic material, making it sufficiently sturdy to transport. Each component lead foil target is generated with a binary (black and white) film master. The binary film masters are generated by a computer algorithm and are printed on a 356×432 mm x-ray film by digital laser printer. This process yields a very precise target design which is mass manufacturable and easily modified if necessary.

Computer Algorithm

Figure 5:
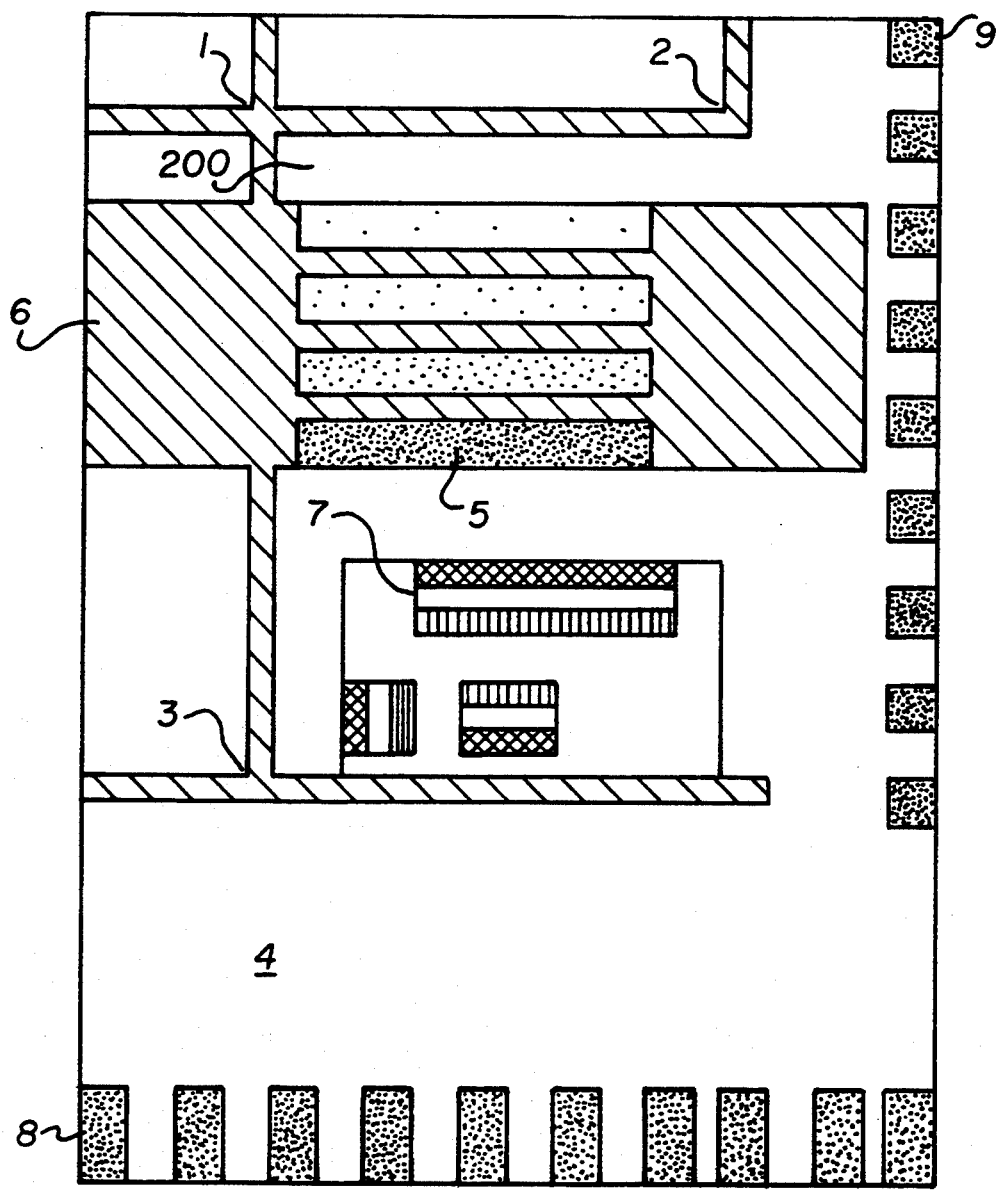
FIG. 5 is a diagrammatic view showing in greater detail the test target of FIG. 4.

A computer algorithm is used to automatically analyze the scanned test pattern data and output data items 1–7 (above). The algorithm performs the following functions (the number references are to FIG. 5):

Reads the scanned test pattern data, and determines the location of the three guide points (1,2,3) as indicated on FIG. 5.

Establishes the tilt and aspect ratio of the scan from the location of the three guide points.

Uses a 512 point Fast Fourier Transform (FFT) in the clear regions (4) to measure the banding noise power. The data is represented in graphical and text form on the user screen.

Exposure latitude is measured using the tone scale information in region (5). The average value and variance of each tone scale region is measured, and compared with the x-ray source exposure index to establish these values uniquely.

After the exposure latitude is established, the Signal to Noise Ratio (SNR) for each tone scale region is determined analytically.

Electronic noise floor is evaluated by Fourier analysis of the opaque region (6).

Scanner resolution is determined by measurement of the Modulation Transfer Function (MTF) associated with the bar targets in region (7). The MTF is estimated using a standard visibility technique.

Geometric linearity is determined by measuring the inter-symbol transitions in the fast scan (8), and slow scan (9) directions.

Flare is evaluated in region (200) by calculating the percentage of diffuse backscatter into the detector.

Following is a detailed discussion of the algorithms and exposure techniques used to evaluate each of the performance attributes listed above.

Exposure Technique For the Test Target

Figure 6:
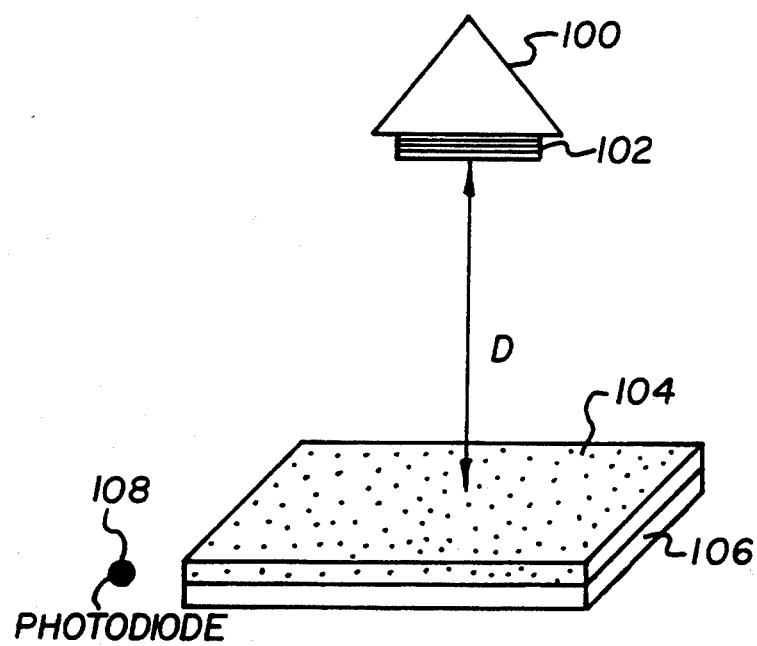
FIG. 6 is a diagrammatic perspective view showing x-ray exposure of a test target.

The exposure setup is shown in FIG. 6. As shown, x-ray source 100 exposes storage phosphor 106 through test target 104 (FIG. 5). In order to generate a known x-ray beam energy and spectrum at the storage phosphor plane, four x-ray generator parameters are set at fixed operating points. These parameters are:

Distance (D) from source to storage phosphor cassette (D=829 mm is typical).

X-ray tube peak voltage setting or "technique": (75 kVp (kilo-volt peak) typical).

Total integrated current flow (9 mAs (milliamp-second) is typical).

Beam filtration (as specified by government regulations).

Due to the variations in the state of calibration for a typical x-ray source 100, the fixed operating conditions above will, in general, only guarantee accuracy of the resulting x-ray beam energy at the storage phosphor plane to ±20%. This is acceptable for the majority of the analysis routines, with the exception of the signal to noise ratio (SNR) analysis. SNR analysis requires ±5% accuracy if possible. In order to establish the true beam energy to within ±5%, a calibrated x-ray photodiode 108, with a phosphor screen covering the sensor area, is placed at the storage phosphor plane at the time of exposure. The photodiode 108 current is buffered and amplified to give a calibrated response of 1 millivolt per milliroentgen of incident exposure, thus giving an accurate estimation of the x-ray beam ionization energy. This value is recorded and entered into the computer as a reference value for the SNR analysis.

When the test target 104 has been exposed and scanned by reader 10, the computer program is invoked and reads the image data into memory in control 32. The initial function of the computer program run by the microcomputer of control 32 is to locate the three corner points (1,2,3) (FIG. 5), and thereby establish orientation. The corner points are located by a differential contrast edge detection algorithm. The data is read in one line at a time beginning near the top and sequentially working down through the image. The differential edge detector is capable of locating the leading and trailing edges with a ±1 pixel error. Once the three corner points are identified, a calculation of the image tilt is performed for the vertical and horizontal directions using the standard slope intercept formula for an algebraic line. If the tilt is measured to be less than 1.0 degrees in each direction, the scan orthogonality is acceptable, and further processing may continue. In practice, the target orthogonality only requires that the test target be secured properly to the SP cassette before exposing, as shown in FIG. 6. Once the reference points are identified by the algorithm, each of the test target areas in the scanned image file is easily accessed through a known pixel offset.

Evaluating Exposure Linearity

Exposure linearity is determined by evaluating the mean code value (digital gray scale value) in each of the five step wedge locations of the test target (5) (FIG. 5). In terms of lead foil thicknesses, the steps preferably correspond to 0 mm, 0.05 mm, 0.10 mm, 0.20 mm, and 0.30 mm thickness. At a typical x-ray source 100 setting of 75 kVp and 9.0 mAs (approximately 20 mR), each 0.05 mm thickness reduces the count level by approximately 250 counts from a 3200 count baseline for zero attenuation. Thus, in this example, the effective transmission values are 1.0, 0.6, 0.3, 0.1, 0.03. The program locates each region of density data sequentially, and then calculates the mean scanned code value for a sample of 1000 pixels in each step area. This gives a relative sampling error of 3%. The code values are in logarithmic optical density units.

Signal to Noise Ratio

Signal to noise is evaluated for each of the density setup regions by computing the linear signal average using the formula:

$$X = 10^{**}(CV/1000)$$

where:

X is the linear signal value

CV = the measured code value

The noise for each density step is given by the standard deviation Sigma (X) as measured over the 1000 independent samples for each pixel location in the density strip. The density step signal to noise ratio is then $$SNR = <X>/Sigma(X)$$

Figure 7A:
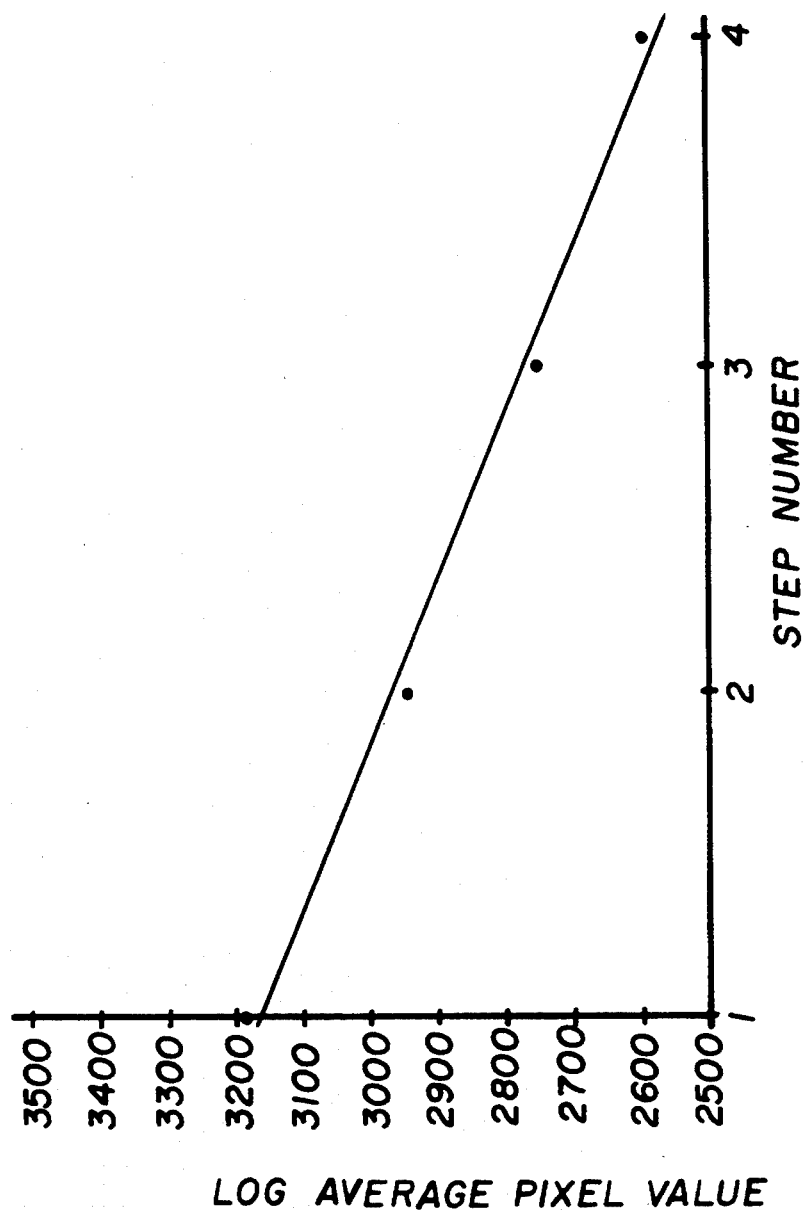

The calibrated exposure level E(X) for each density step is predetermined from the known attenuation value corresponding to each density strip on the test target, and the calibrated x-ray source energy value given by the photodiode response. A plot of log(SNR) versus log(E(X)) is generated on the computer screen, and a least squares line fit is generated on the plot. A good scanner will yield a straight line plot with a slope ≧0.5. A slope of 0.5 is the theoretical quantum noise limit. An example of a SNR versus exposure graph for a storage phosphor system is shown in FIGS. 7A,7B.

Spatial Resolution

Spatial resolution of the reader 10 is determined by evaluating the line visibility function for each of the resolution segments of the test target (7) (FIG. 5). The line visibility is evaluated for a single resolution segment by selecting out the central region of the segment, finding the average of the 10 highest and 10 lowest code values (code value, or cv, is a digital signal value and depends on the bit depth of the pixel,. e.g., a 12 bit pixel can have a cv of 0-4095) for each line pair in the segment, and averaging these results over the total number of line pairs evaluated in the segment. Typically over 5000 code values (pixels) are averaged in total, which gives a great deal of noise suppression (1.4% relative error), and yields accurate, repeatable results. In between each set of line pairs is a solid high or low density strip. The program averages 1000 points in each of these strips to generate a reference value.

Figure 8:
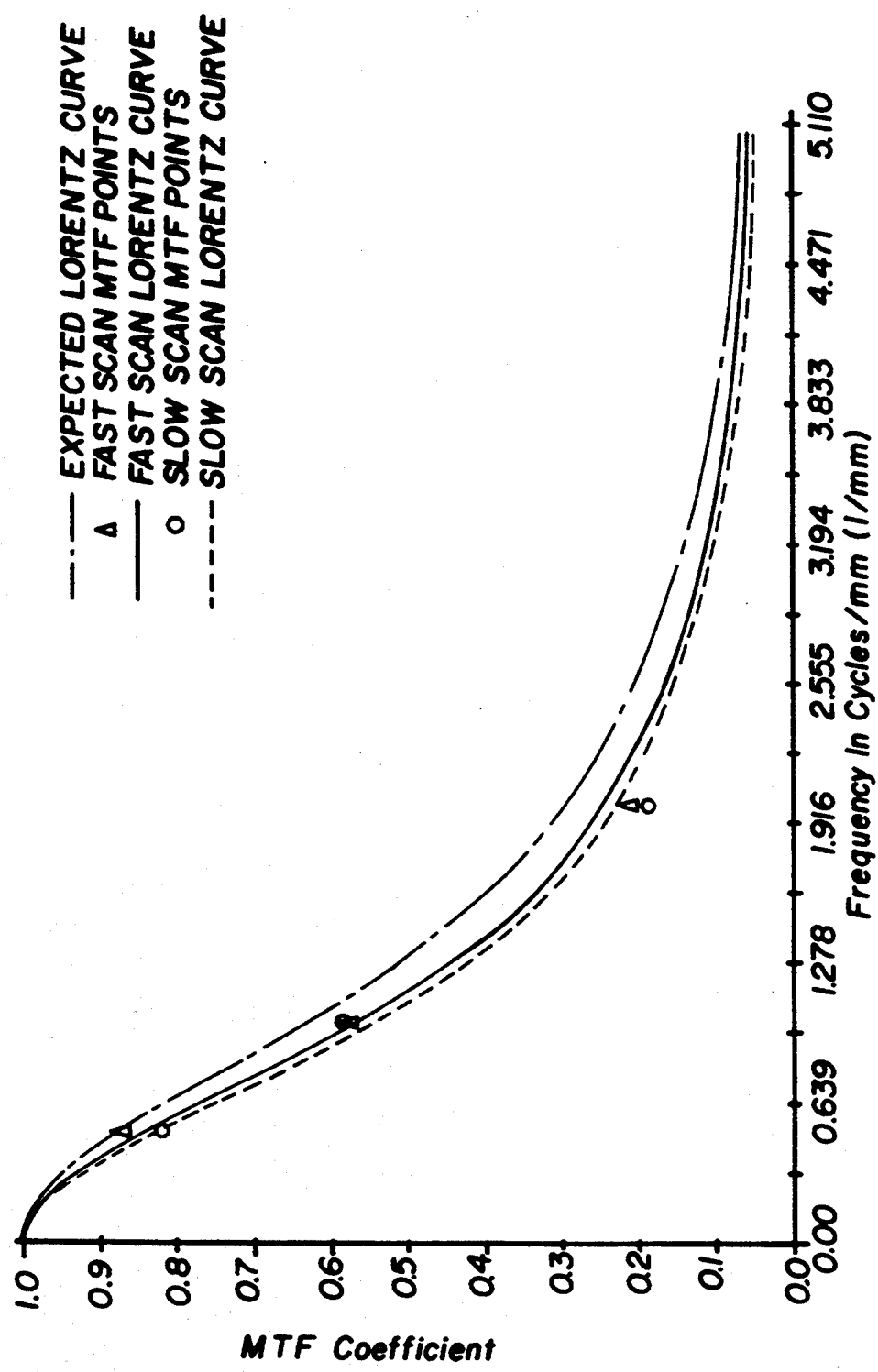
FIG. 8 is a graphical representation of real versus expected MTF for a storage phosphor reader.

The visibility modulation is then determined by the equation:

$$MTF = (<High> - <Low>) / (<Ref\_high> - <Ref\_low>)$$

where MTF is the approximate modulation transfer function. The function has a maximum value of 1.0 corresponding to perfect visibility, and a minimum value of 0 corresponding to zero visibility at this spatial frequency. Three spatial frequencies are used corresponding to 0.5 line pairs (lp)/mm, 1.0 lp/mm, and 2.0 lp/mm. The data are fit to a Lorentzian curve to determine the approximate resolution MTF. A graph of the real versus expected MTF for a scanner with a nominal 175 micro-meter pixel size is shown in FIG. 8. A graphical representation of the methodology used to measuring the MTF for a 1 line pair/mm cycle pattern is shown in FIG. 9.

Geometric Scan Linearity

Geometric linearity of the scan is the measure of the degree of geometric distortion, i.e. an unwanted enlarging or demagnification of any or all parts of the scanned image. It also includes the appearance of geometric tilt, and/or breaking lines in the image. A magnification distortion is likely to show up at the beginning and the end of each scan line because the angle of the scan beam is at a maximum under these conditions. This distortion is automatically corrected in the scanner firmware in a properly functioning unit. In the page scan direction, geometric distortion shows up as tilted or breaking lines if there are spurious problems with the page scan stepper motor or other transport problems.

The algorithm measures the geometric scan linearity in both fast scan direction by measuring the distance in pixels between each of the black to white transitions for the 1 cm "comb structure" located at the bottom of the test target (8) (FIG. 5). Likewise, the slow scan linearity is measured using the square symbols on the right hand side of the target (9) (FIG. 5). In both cases, an edge detection algorithm is used to accurately locate the edge transitions between the symbols. The accuracy is ±1 pixel for each transition. This results in a measurement accuracy of <1% distortion since the pixel size is 0.175 mm, and the symbol spacing is 20 mm. The edge detection algorithm is described later.

Artifacts Due to Mechanical Vibration

Vibrational artifacts in a SP image show up as a series of horizontal or vertical "bands" throughout the image. Vibrational artifacts result from mechanical artifacts of translation stage 34, sliding on rails 40,42, screw drive mechanism 48, stepper motor 50, among others. Since there is always a certain level of vibration, and thus "image banding", the purpose of this subroutine is to evaluate the banding energy quantitatively, and insure that it is within the acceptable limits. The subroutine measures the power spectrum within two flat field regions of the test target (4) (FIG. 5), and plots the results over the spatial frequencies of interest. A threshold curve is overlaid on the graph which indicates if the measure banding power spectra are within acceptable limits.

The power spectrum routine calculates the noise power spectrum over 512 sampling points (pixels), and outputs the averaged power spectrum for the region of interest with frequency response of 0-2.9 cycles per mm for a 175 micron pixel (0-0.5 cycles per pixel). The power spectrum output is plotted over 512 sampling intervals corresponding to a 0.0057 cycles/mm resolution in this example. A Welch window is used in the algorithm to minimize high frequency ringing effects, and an optimal averaging technique is used to suppress noise. Typically, 25 contiguous 512 pixel data segments are averaged, giving a total noise reduction of >20:1 for the power spectrum output. Increased averaging is optional. Averaging the power spectrum data insures that the noise spikes measured are significant features of the image data in the region of interest.

Figure 10A:
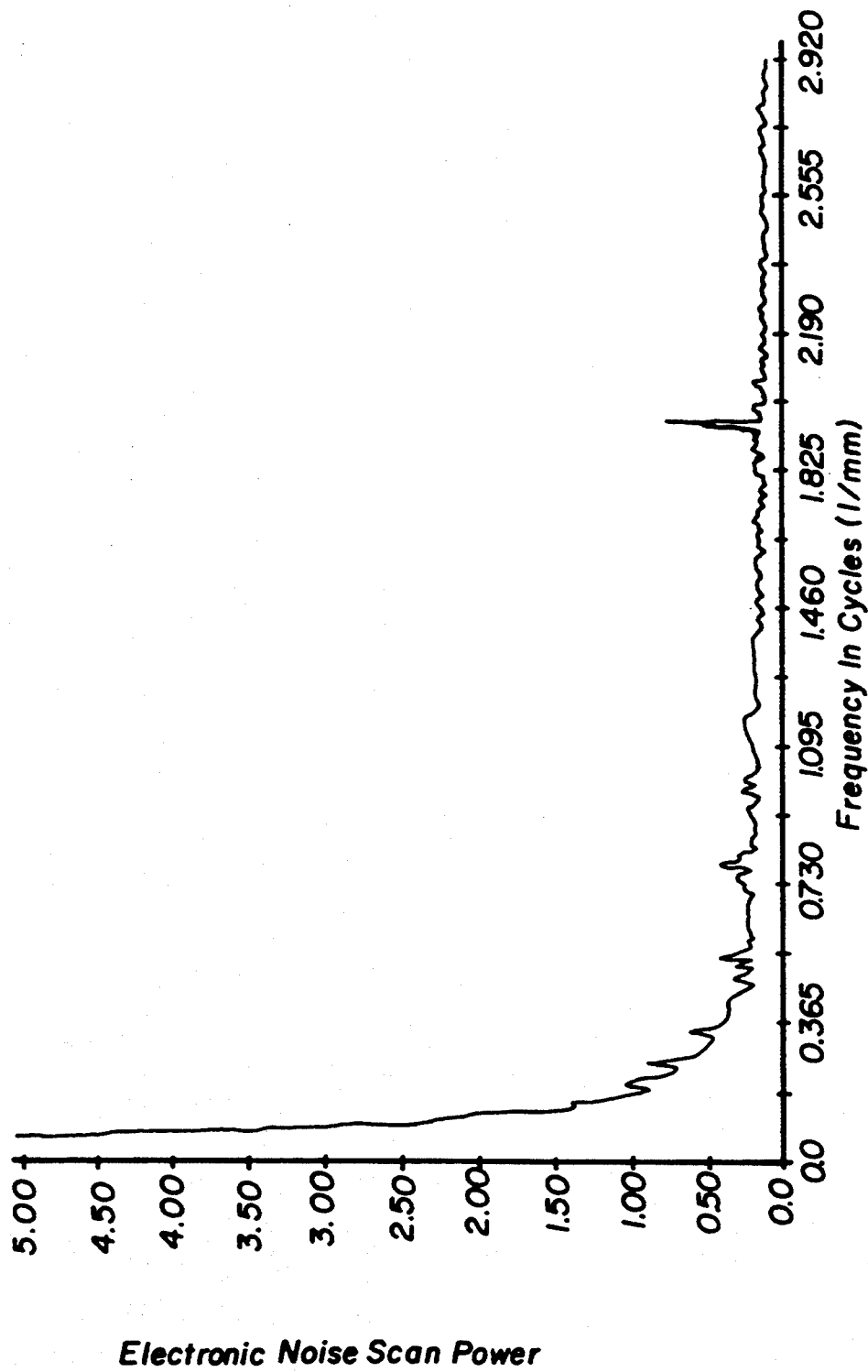
FIGS. 10A and 10B are respective graphical representations of slow scan and fast scan power spectrums.
Figure 10B:
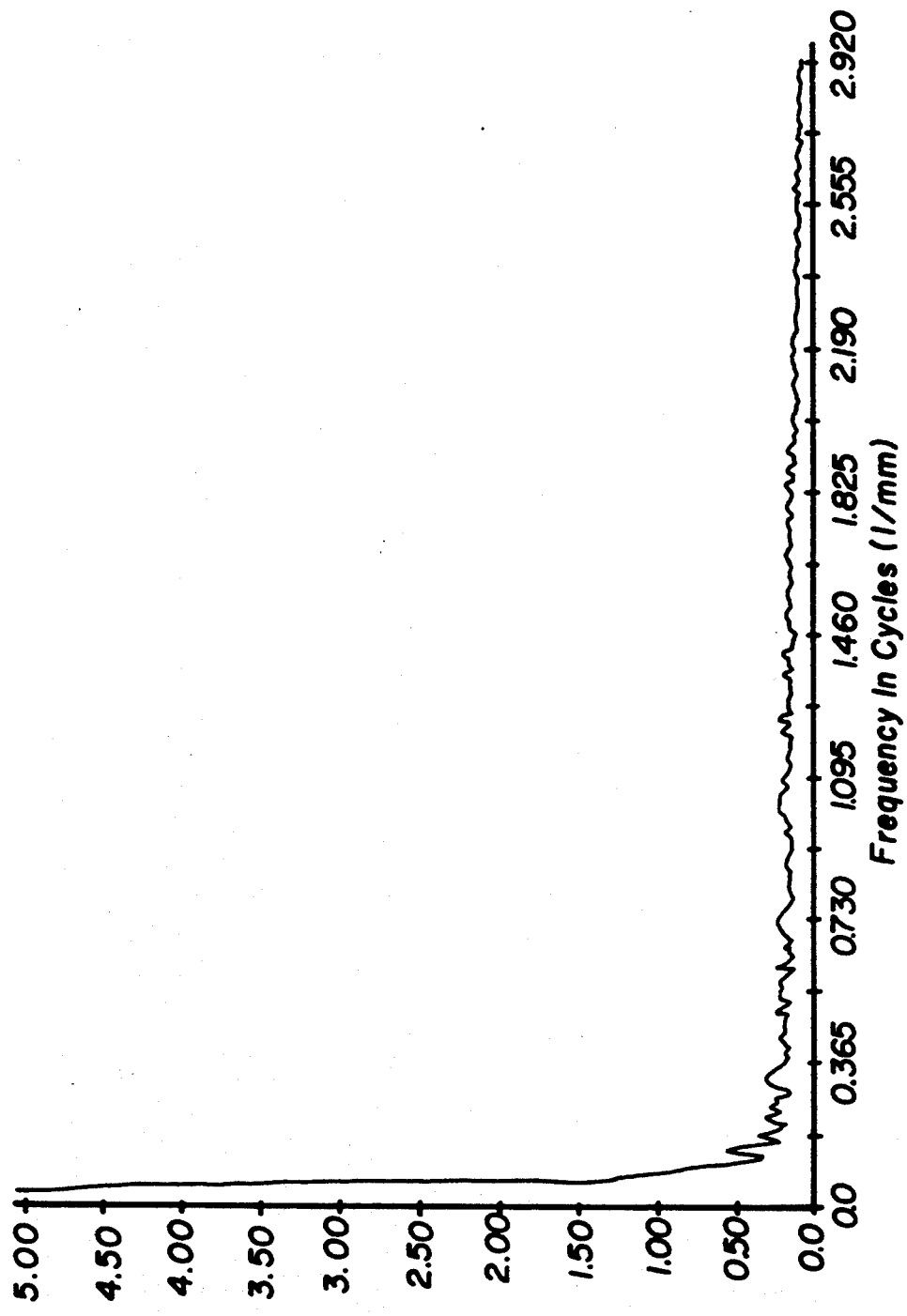

Example output is shown in FIGS. 10A,10B.

Electronic Nose Artifacts

Electronic noise artifacts are also evaluated using power spectral analysis. The analysis is performed on a dark region of the test target (6) (FIG. 5). As in the banding energy calculation, a predetermined threshold is displayed which indicates the acceptable noise limit.

Flare

Flare light is a collector 80 (FIG. 3) artifact which reduces the contrast of an image due to unwanted backscatter entering the collector 80 from neighboring bright regions. The flare light ratio is measured by averaging the dark signal value in region (6) (FIG. 5) of the test target which is surrounded by bright regions, with that of region (4). The ratio of the two signal levels gives the percentage of flare light susceptibility for high contrast regions.

CORNER AND EDGE DETECTION TECHNIQUE

The algorithm locates corners and edges in the scanned image using a histogram threshold method. The histogram is defined by evaluating the parameters $<H>$ and $<L>$ which are respectively the average count values for the high and low transmission regions defining the symbol of interest. A binary histogram is then defined by the threshold transition value:

$$T = (<H> + <L>)/2$$

Physical Interpretation of Scanner Signal Data

The reader 10 assigns count values which correspond to the beam transmission in logarithmic "milli-density"

units. Thus, if the beam transmission is attenuated by a factor of "X", the scanner assigns the value of $$\text{Count} = \text{max\_count} + (\log(X) * 1000)$$

where max_count=3200 typically, and $0 < X < 1$. As an example, absolute transmission values of X=1.0, 0.1, 0.01, and 0.001 results in count values of 3200, 2200, 1200, and 200, respectively, for a well calibrated scanner. Thus, the count value is an increasing function of the transmission, and (by definition) a decreasing function of attenuation.

Corner Points

The lines defining the three orientation corner points (1,2,3) (see FIG. 5) are comprised of six lead foil layers, and will therefore have the maximum absorption (minimum transmission) signal in the scanned target image. The program first determines the $<H>$ and $<L>$ values for this region by averaging the highest and lowest code values in the first 20 lines of the image, and defines the histogram threshold value T. Using prior knowledge of the approximate corner location (x,y pixel), the algorithm reads successive lines in the horizontal and vertical directions, and locates the X coordinate for which three successive horizontal line segments reach the threshold value at the same location. The same procedure is performed to find Y using vertical line segments. This technique is accurate to $\pm 1$ pixel, computationally simple, and fairly immune to spurious noise spikes. The procedure is used to find the X,Y location for all three corner points. As a final check, the pixel separation between corner points is evaluated, and the amount of tilt is calculated. If the tilt exceeds 1.0 degrees, the scan is rejected.

Edge to Edge Linearity Calculations

The fast and slow scan linearity measurements are performed on regions (8) and (9) of the test target (FIG. 5). In both of these regions, the symbol separation is 1.0 cm which gives a reference in standard units. The symbols are one layer deep, hence their transmission value is determined from density patches #1 and #2 in region (6) (FIG. 5) of the test target. Using these as the reference values for $<H>$ and $<L>$, respectively, the new threshold is evaluated and used to determine edge to edge transition distances between the symbols in the manner described previously.

Software Implementation of Invention

Figure 11:
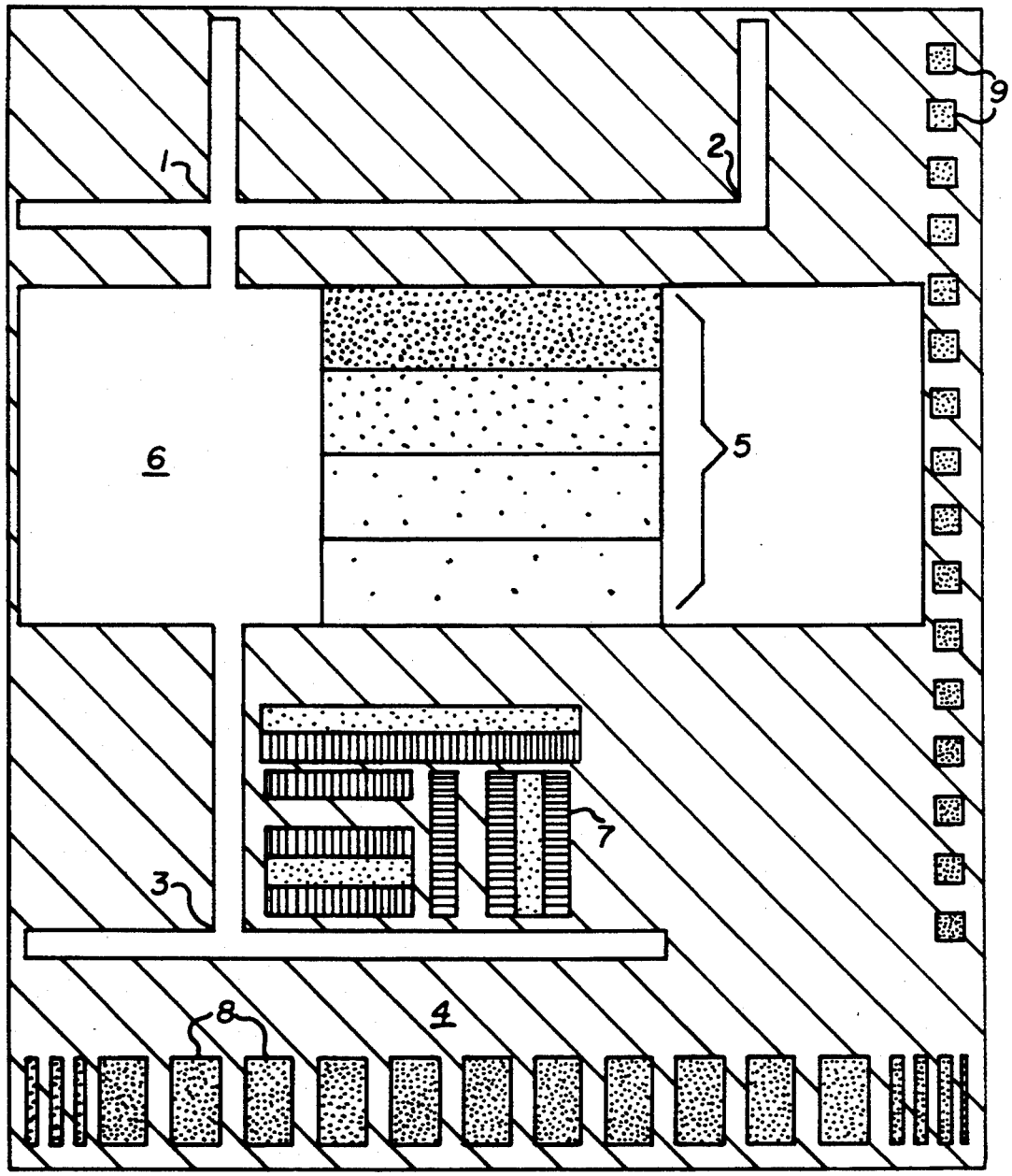

The purpose of the following description is to describe the requirements for a software utility resident in control 32 of storage phosphor reader 10 which will analyze the scan of a storage phosphor plate which contains an x-ray exposure of a specially designed lead masked test target (FIG. 11 shows a screen on monitor 14 of test target 104, FIGS. 4–6). The following image quality parameters are analyzed:

a) Geometric Linearity (Fast Scan and Slow Scan Directions)
b) Spatial Resolution (MTF)
c) Exposure Latitude and Linearity
d) Signal to Noise Ratio
e) Slow Scan and Fast Scan Banding (Power Spectrum)
f) Electronic Noise
g) Flare Definitions and Acronyms KESPR: KODAK EKTASCAN Storage Phosphor Reader
QCW: Quality Control Work Station
PDS: Personal Display Station
KELP: KODAK EKTASCAN Laser Printer
KEICCS: KODAK EKTASCAN Imagelink Critical Care System which can consist of a combination of KESPRs (Optional Autoloader), QCWs, PDSs, KELPs.
MTF: Modulation Transfer Function (A measure of spatial resolution).
mAs: Integrated x-ray Tube Current in milliampseconds (Tube current over time).
KVP: Peak x-ray Tube Potential in kilovolts (Voltage)
Fast Scan Direction: Direction of the Galvo 72,74 (FIG. 2) Sweep across the phosphor plate.
Slow Scan Direction: Direction of the Stage 34 Stepper motion.
Densei: Hand held barcode reader used for patient data and exposure collection system.
LPM: Line Pairs Per Millimeter.
BYTE: C data type unsigned character (8 bits).
WORD: C data type unsigned integer (16 bits).
LONG: C data type unsigned long integer (32 bits).
TIFF: Tag Image File Format.
(NOTE: KESPR, QCW, PDS, KELP, KEICCS are trademarks for products supplied by the Eastman Kodak Company, Rochester, N.Y.)

IMAGE QUALITY TEST METHODOLOGY

Figure 21:
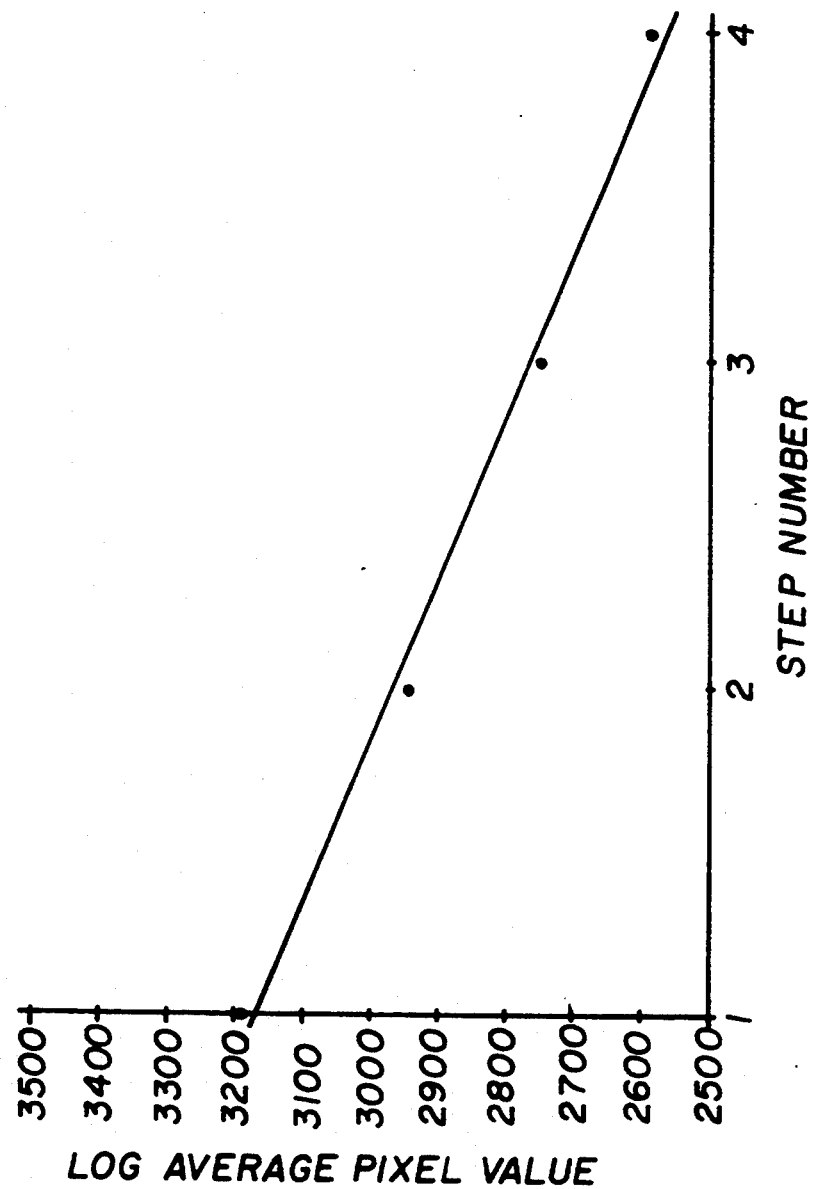

Exposure Latitude, Linearity and Signal to Noise (FIGS. 20,21)

The exposure latitude for the KESPR scanner is expected to be from 0.01 to 100 mR or 40 dB. The lead masked test target (FIG. 5, image shown in FIG. 11) has a four level step wedge with a total attenuation of 10.0 to 15.0 dB. For each wedge, the arithmetic mean and variance of a 1000 pixel area in the wedge center shall be calculated and compared to expected values for the given target used. In order to calculate the expected values, the measured exposure of the test target must be known. The measured exposure value shall be the number obtained from an x-ray dosimeter (108, FIG. 6) present at the time of the target/plate exposure. The mean, variance and signal to noise ratio for all five wedges will be displayed in tabular form along with the predicted values, percent deviation from predicted values and acceptable percent deviation. Exposure linearity shall be evaluated by calculating the linear regression of the five wedge means. A plot of the means with error bars corresponding to the variances for each wedge and the linear regression line (slope and y intercept displayed) shall also be available. The user shall be able to toggle between the two data formats without having to recalculate.

Figure 22:
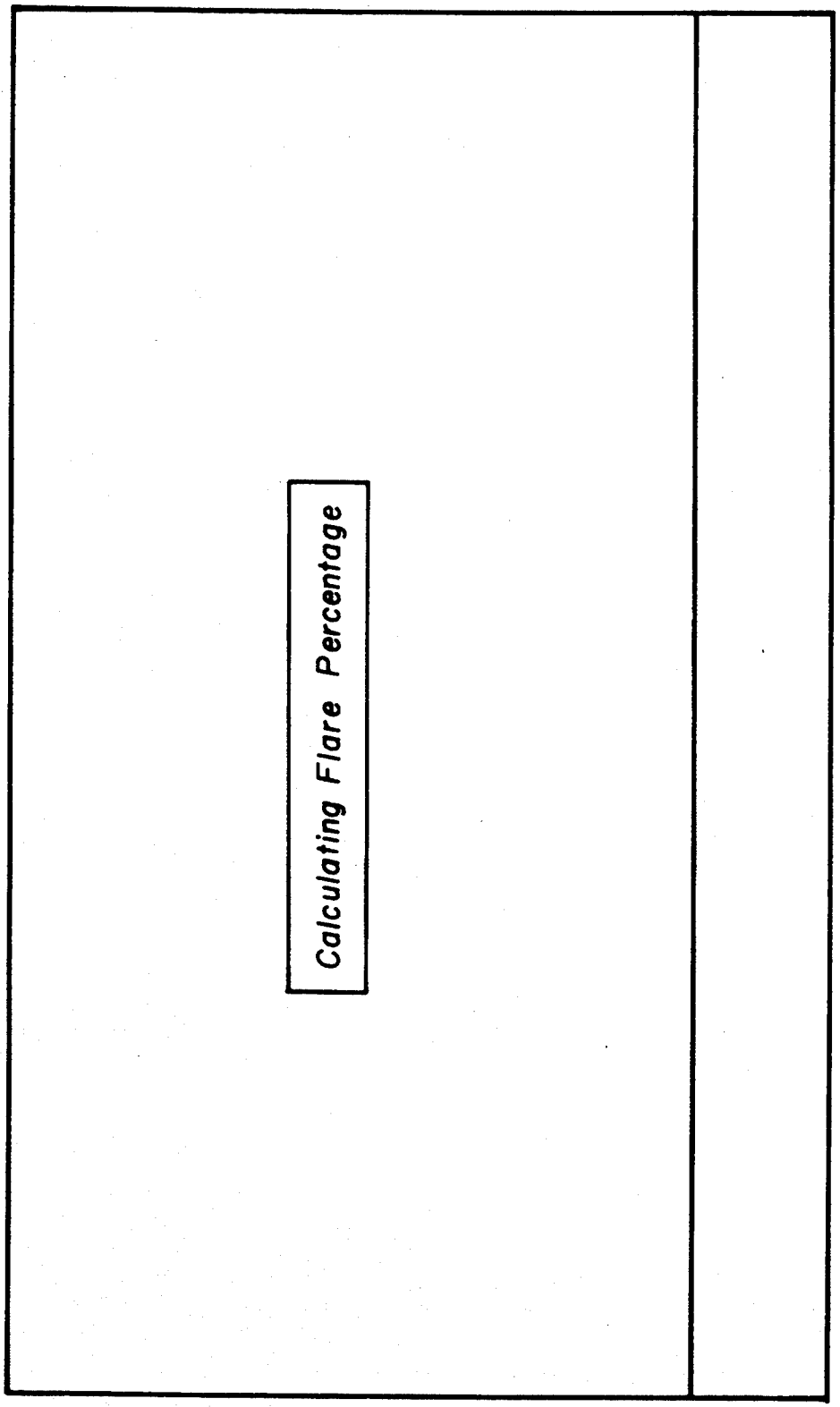

Flare (FIGS. 22,23)

Flare is an artifact which appears when a short transition occurs between black and white during the scan. The flare light ratio is described as the ratio of the mean of a dark region which is surrounded by bright regions to the mean of a flat dark field region. The measured flare, expected flare, and shall be displayed in tabular form.

Figure 24:
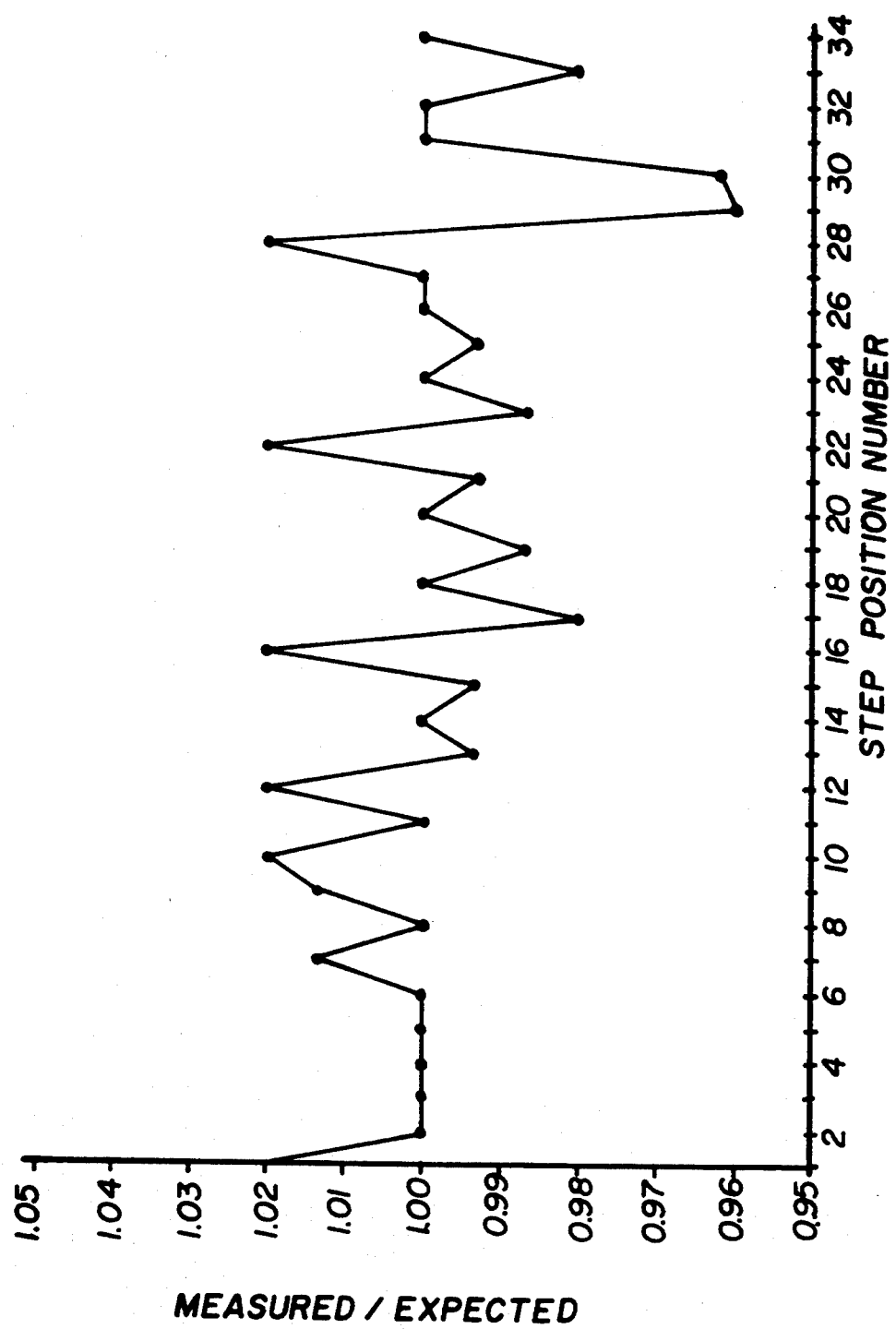
Figure 25:
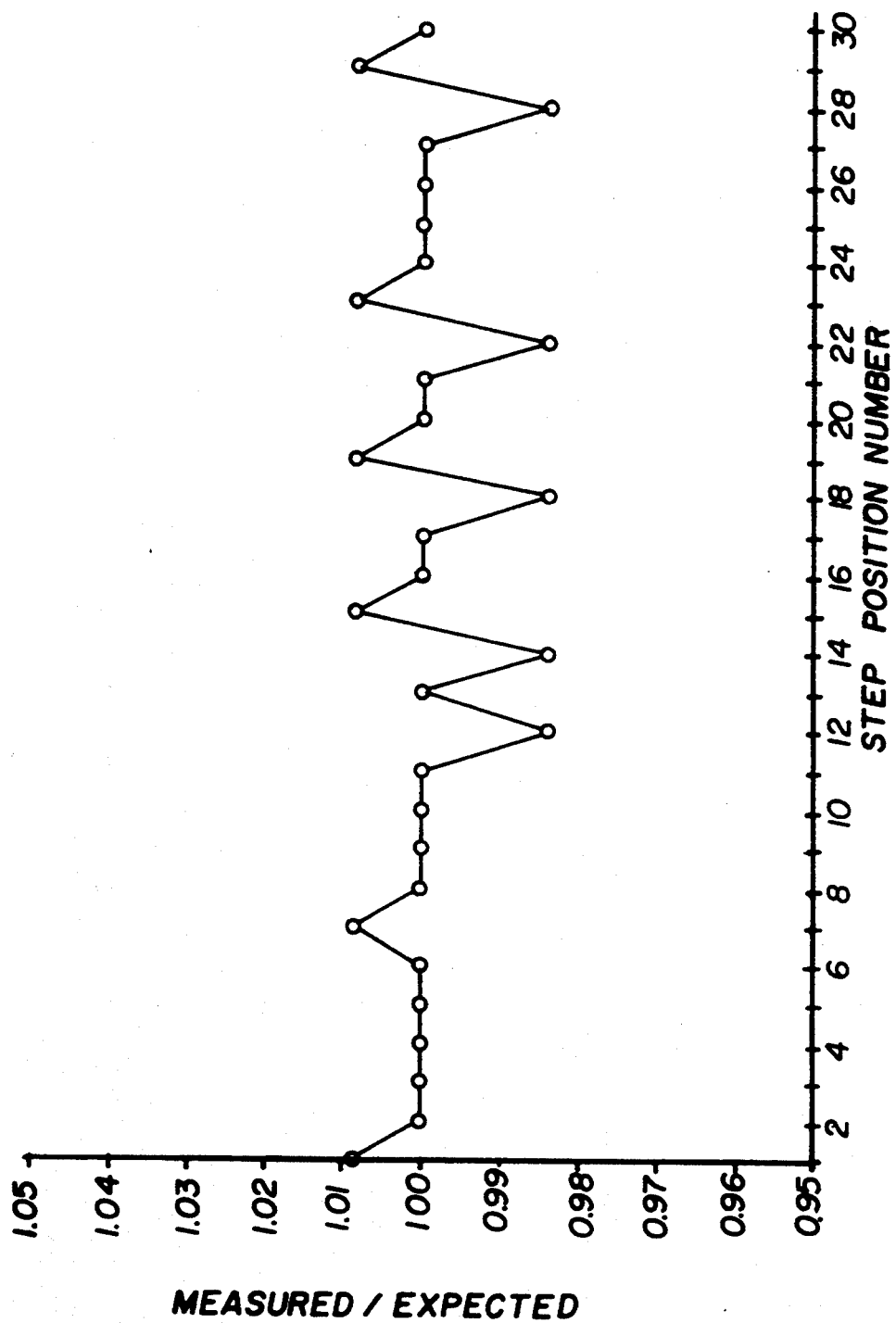

Geometric Linearity (FIGS. 24,25)

Geometric linearity, or aspect ratio, will be tested by counting the number of pixels in both the fast and slow scan directions between alternating patterns of light and dark. These regions are located along the right edge and bottom of the test target. The width in pixels of each light and dark area from the upper right to lower right (slow scan direction) and lower left to lower right corners (fast scan direction) will be measured. The data shall be displayed in two plots which shall consist of the ratio of the measured area width and the expected area width verses the area number. Light and dark area width points will alternate just as they appear on the image. The user shall be able to move between the two plots without having to recalculate.

Figure 27:
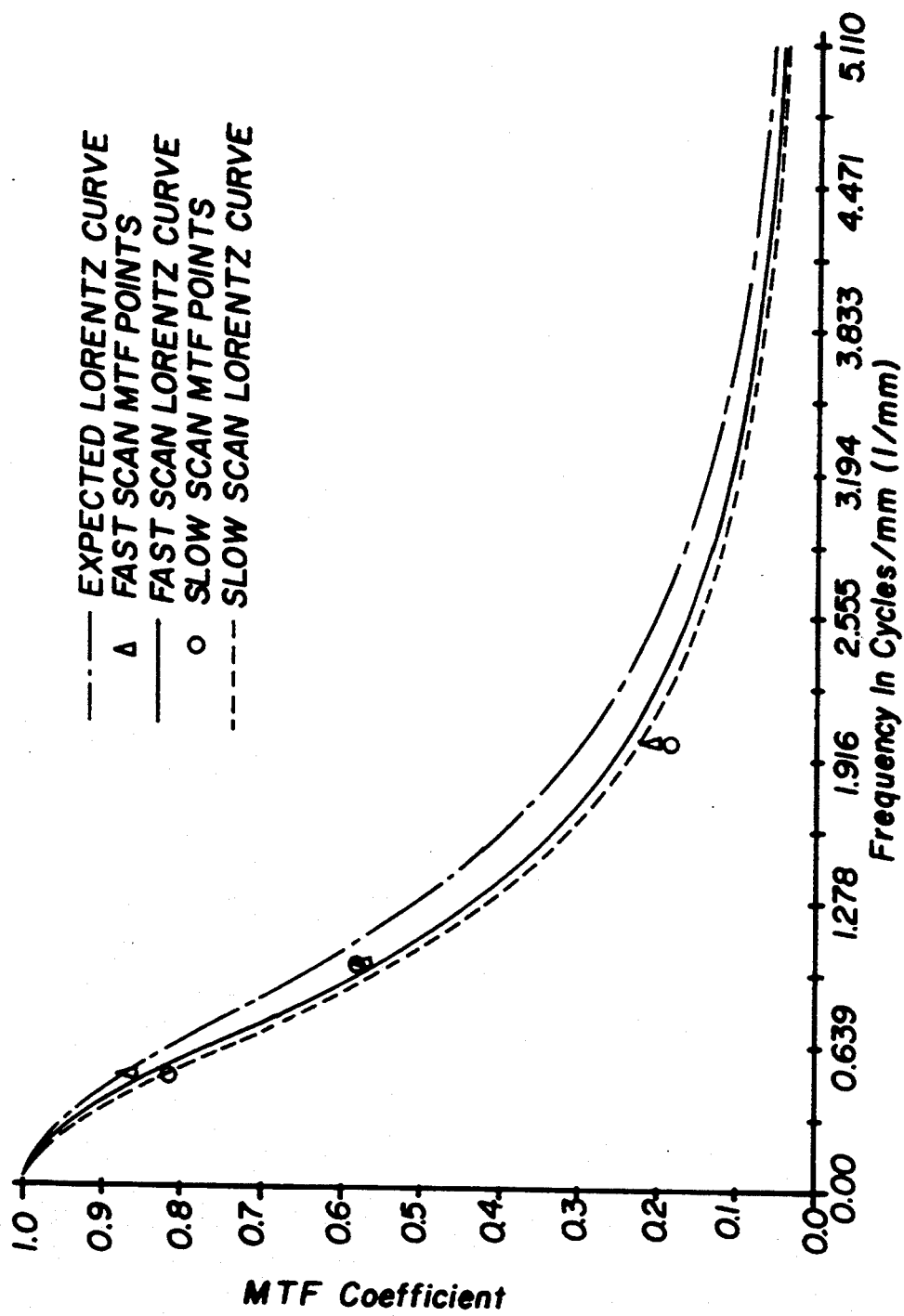

Spatial Resolution (MTF) (FIGS. 26,27)

An MTF, Modulation Transfer Function, will be used to determine the spatial discrimination of test target line pairs. The MTF function will return a modulation number with a value $0 \leq \text{mod. num} \leq 1.0$ with 1.0 as perfect resolution and 0 as no resolution of line pairs. This, along with the average high and average low pixel values, will be calculated for three patterns on the test target, two in the fast and one in the slow scan directions, with line spacing of 1.0 LPM for the upper horizontal pattern and 0.5, 1.0 and 2.0 for the lower horizontal and vertical patterns. The MTF numbers shall be displayed in a tabular form along with expected values. A plot of the actual values with the best fit Lorentzian curve and the expected Lorentzian curve shall be displayed.

Figure 28:
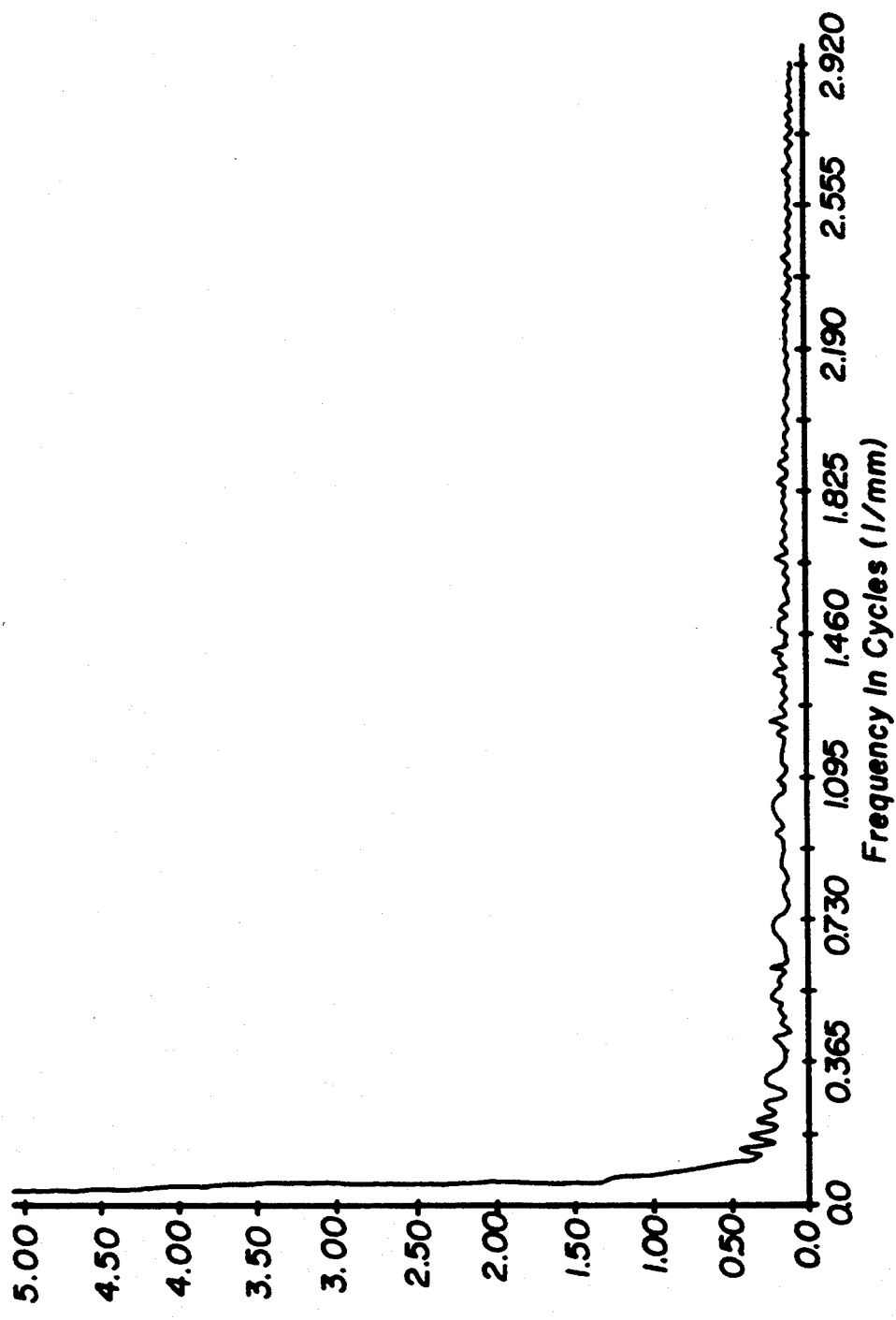
Figure 29:
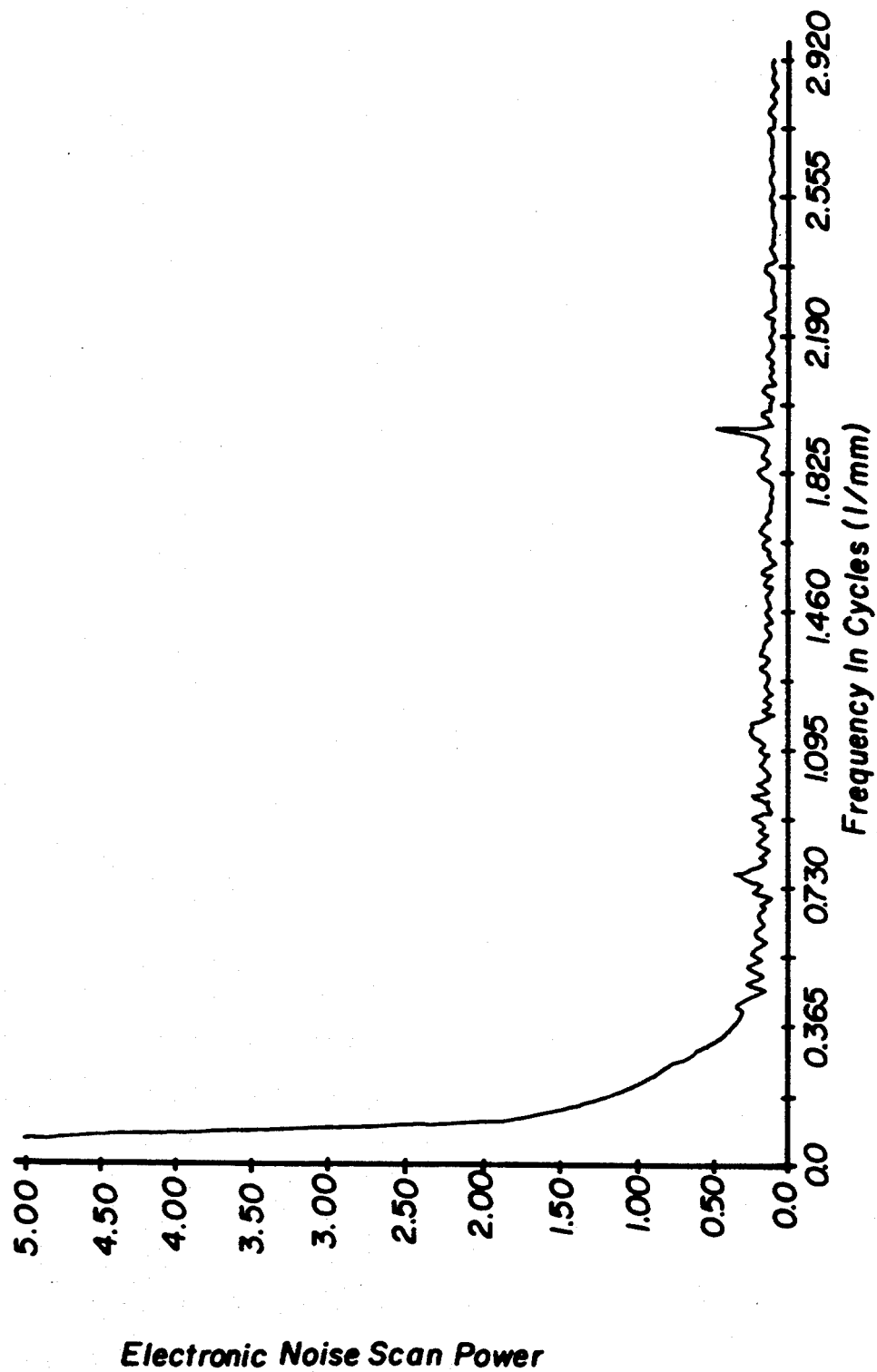

Slow Scan and Fast Scan Banding (Power Spectrum) (FIGS. 28,29)

Unwanted mechanical motions or vibrations can introduce "vertical" or "horizontal" bands to the data of the image scanned. The severity of the bands can be quantified by examining the power spectrum of the Fourier frequencies of a line of image points in the fast and slow scan directions. The power spectrum will be calculated over a full exposed flat field area of the test target in both the fast scan and slow scan directions. The power spectra shall be calculated by averaging a user selectable number of lines (up to 25) of 512 sample points each. The results shall be visualized by a pair of graphs of power spectrum amplitude versus frequency in cycles per millimeter. A curve/line of the maximum acceptable power () for each spectra shall be overlaid on each plot.

Figure 30:
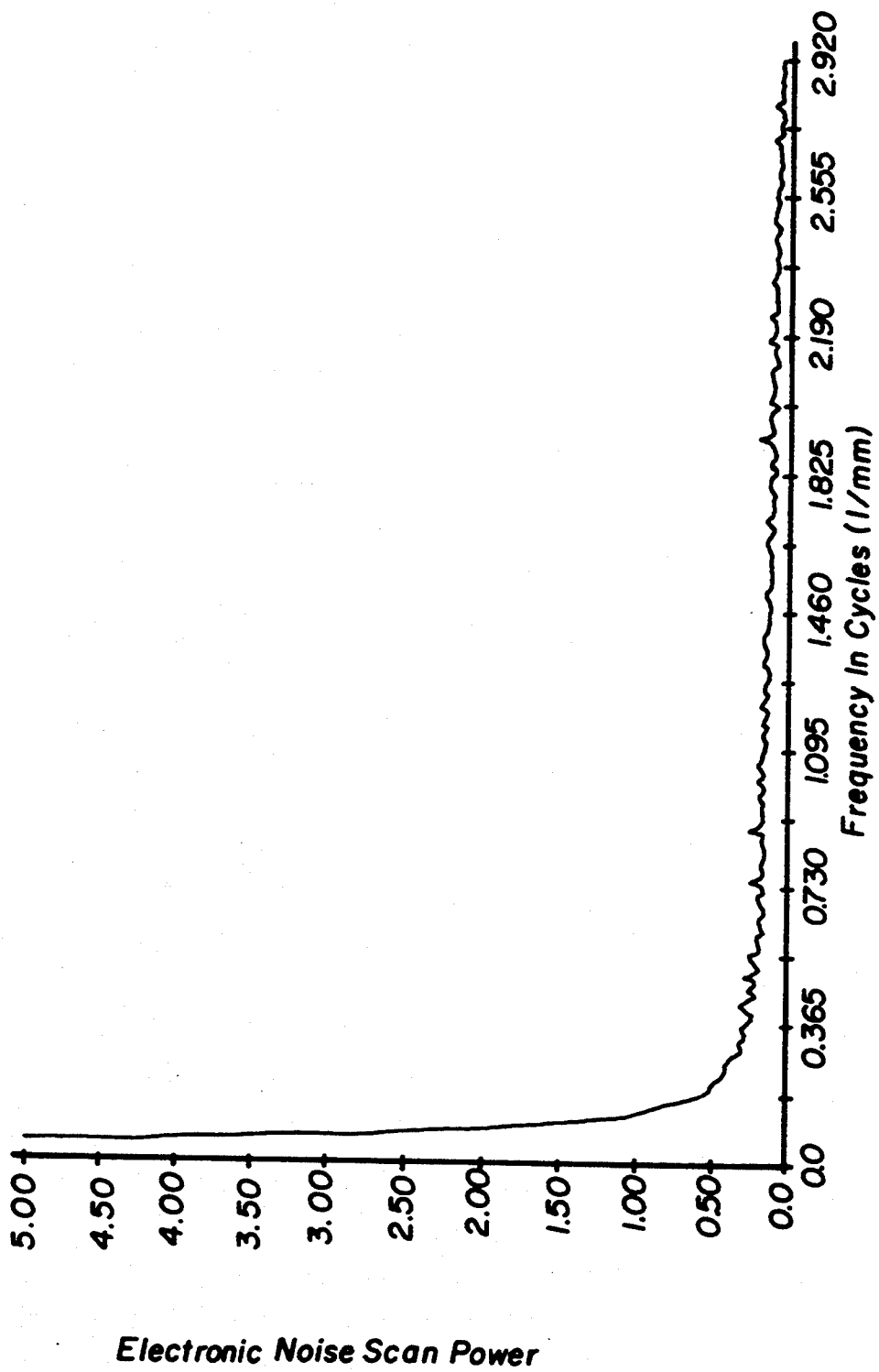

Electronic Noise (Power Spectrum) (FIG. 30)

Electronic noise appears as periodic fluctuations most evident in small signal regions where the signal to noise ratio is lowest. Quantification of electronic noise shall be obtained from the power spectrum of a "light" region (one attenuated by lead) on the test target. The power spectrum is plotted along with a maximum threshold curve as per the fast and slow banding test.

SOFTWARE REQUIREMENTS

General Considerations

Software Interface

Figure 12:
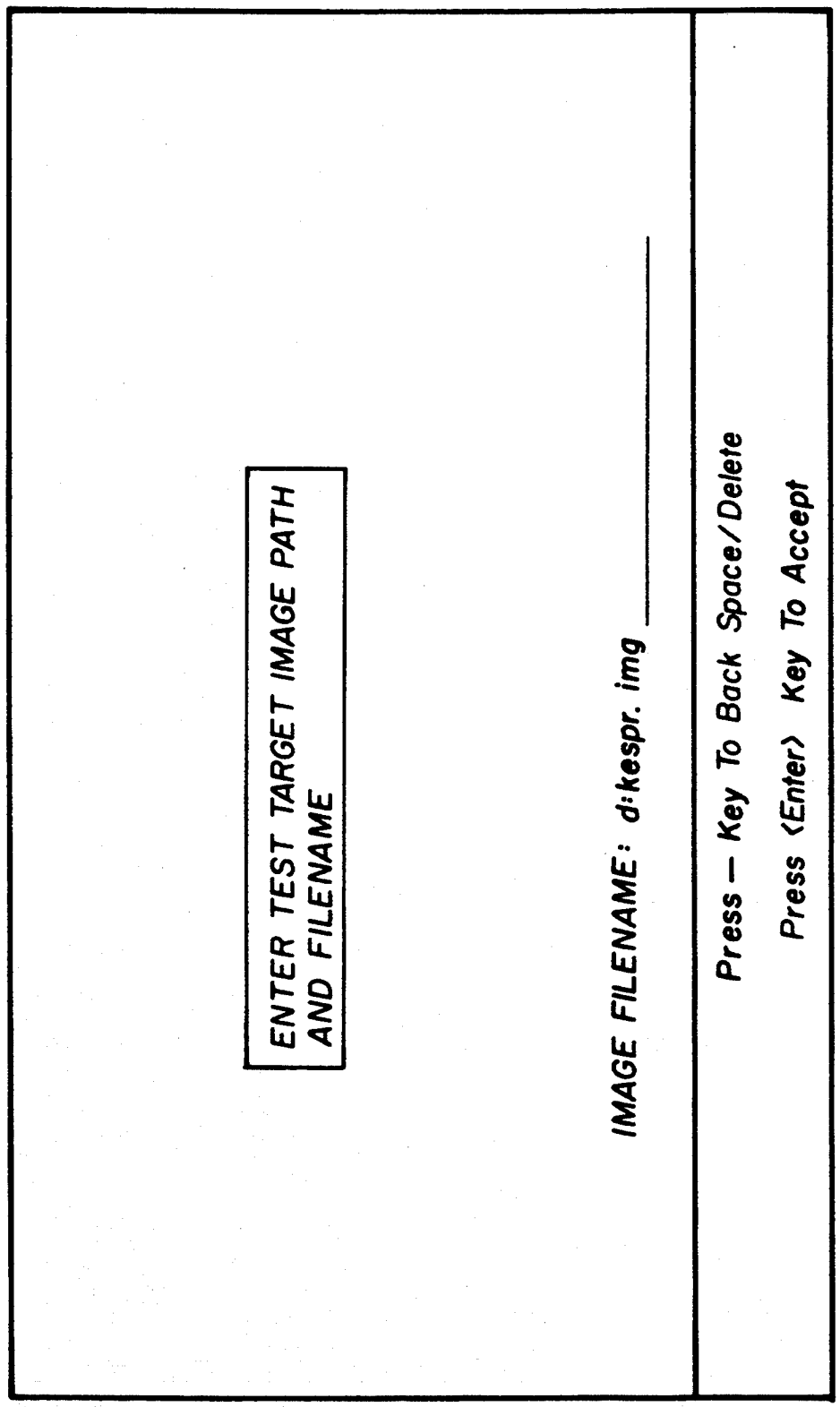
Figure 14:
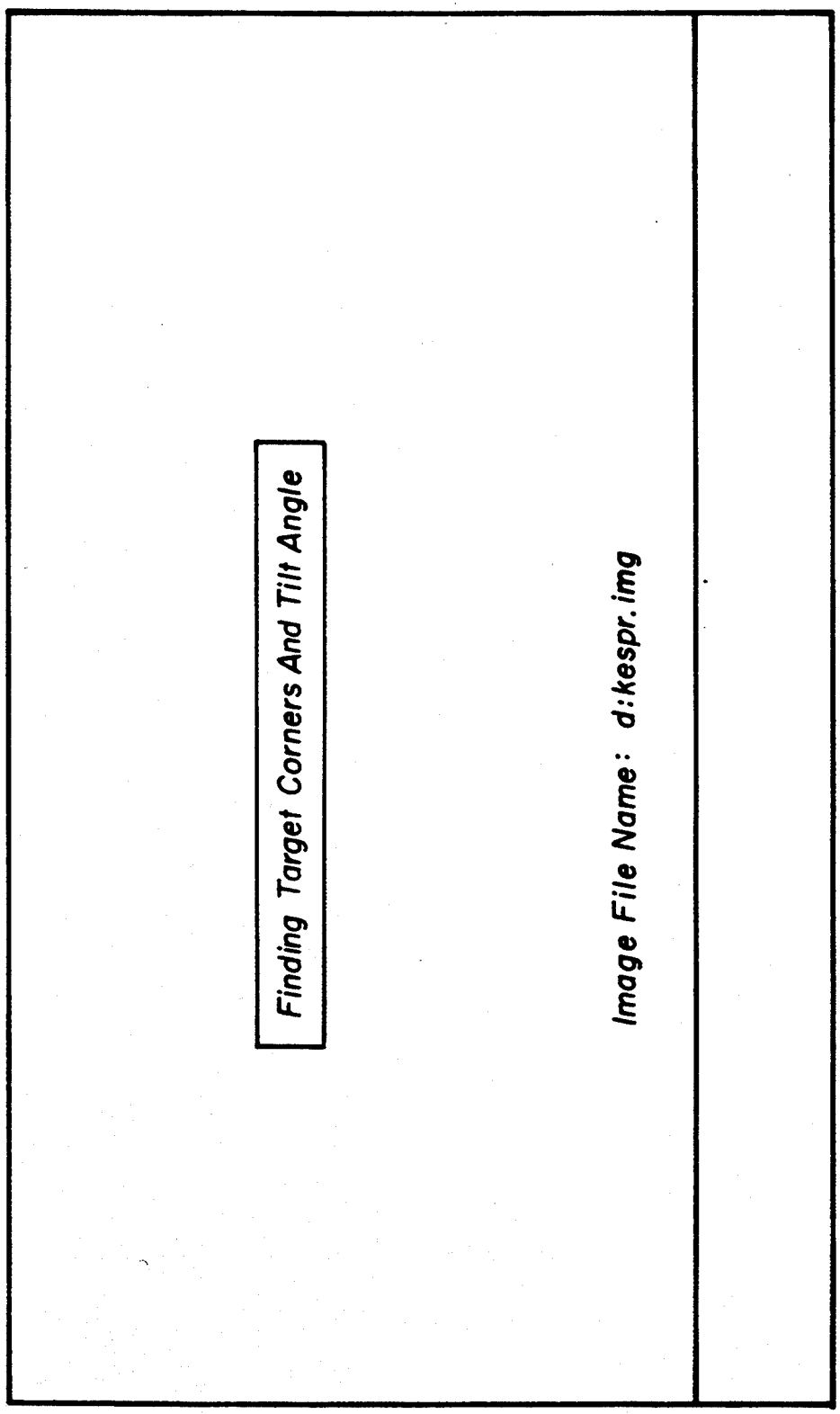
Figure 17:
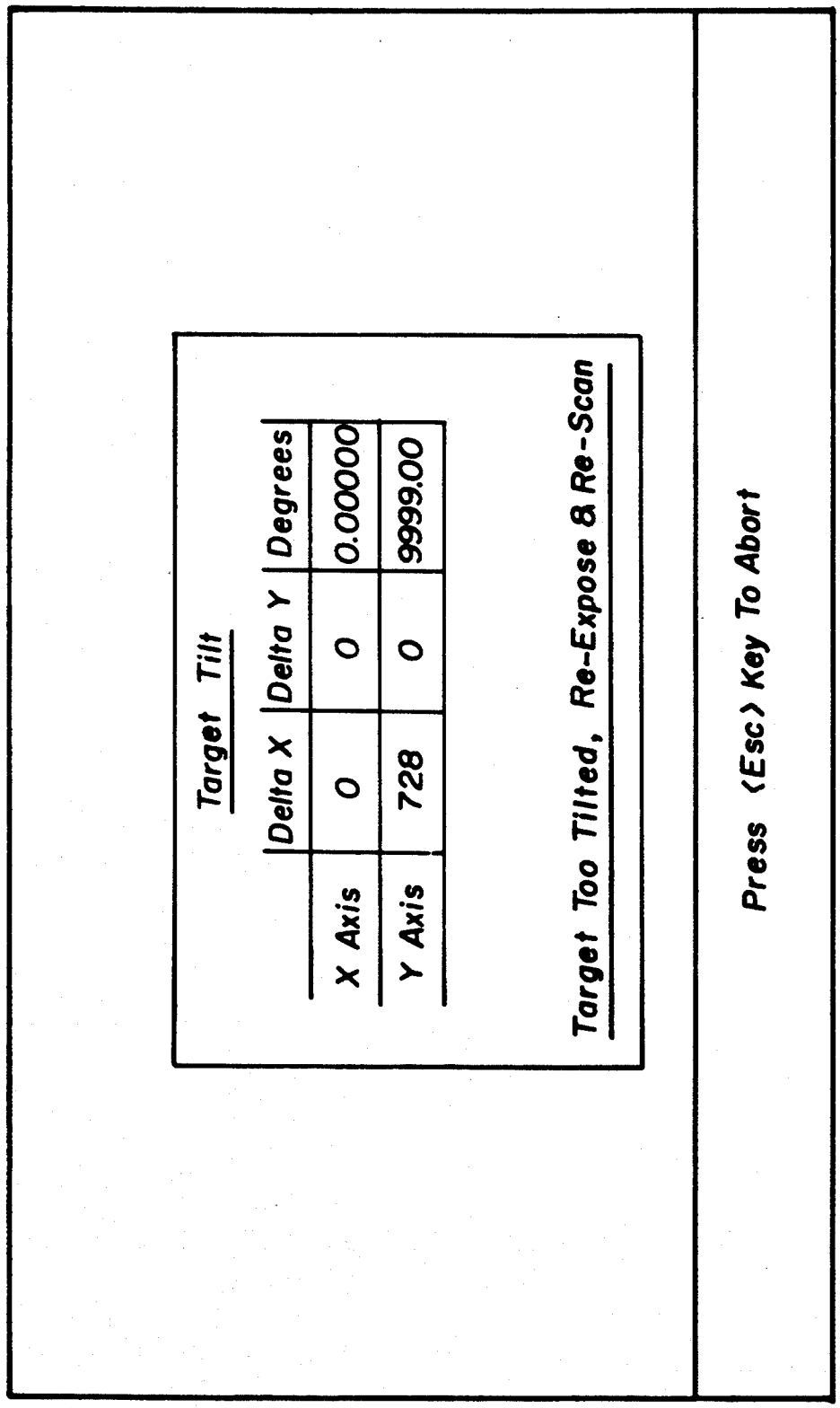
Figure 18:
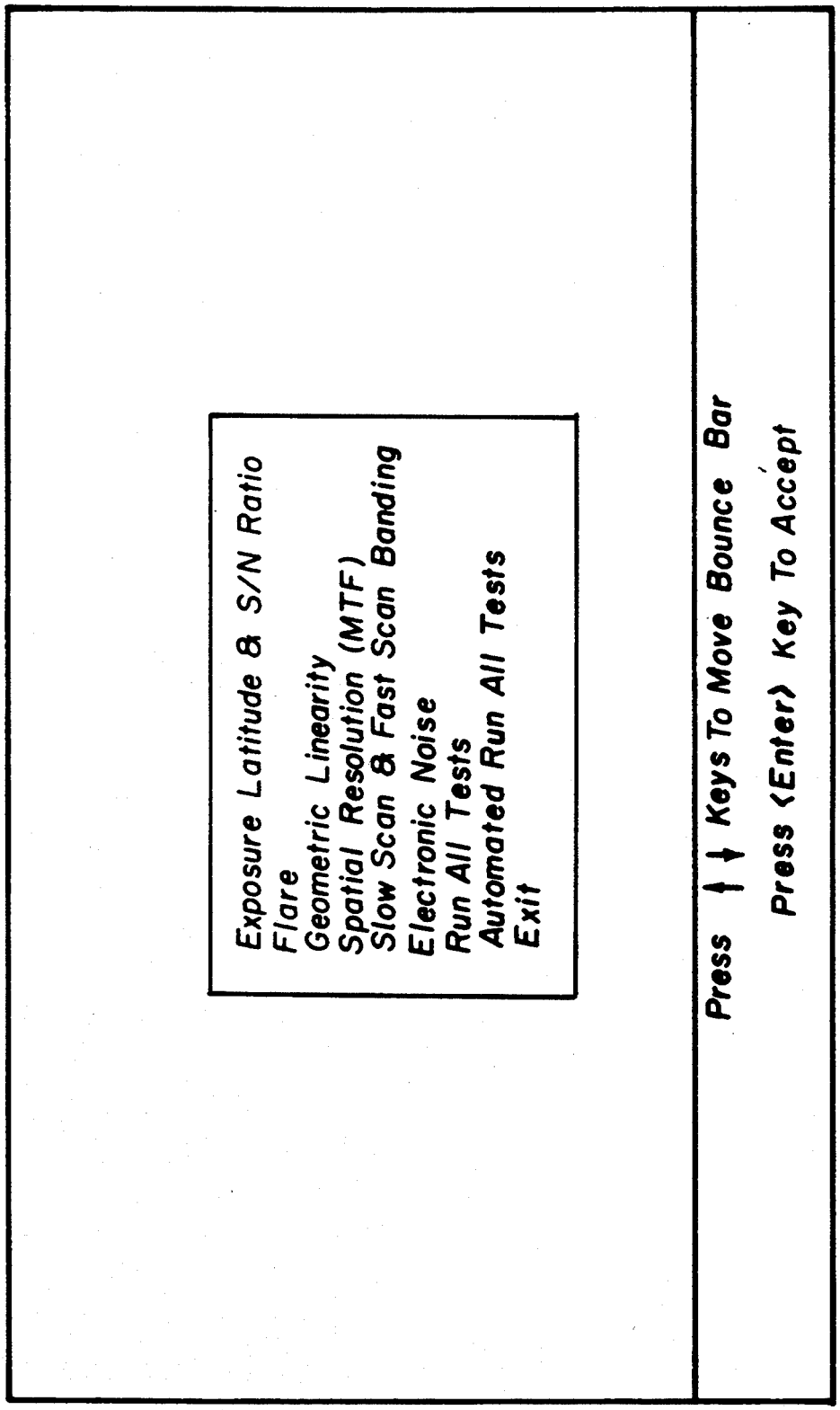

The utility used in control 32 will use the standard IBM VGA video mode of 640×480 pixels by 16 colors and keyboard based user input in order to allow this utility to be run remotely. Text selection will be via a bounce bar menu where the arrow keys are used to move a highlight bar to the desired text and the <Enter> key is used to select the text. The main screen shall consist of a bounce bar menu and instructional text (FIG. 18). When data input from the user is required, the bounce bar menu shall be replaced by a data input line and an information text box (FIGS. 12,13). During calculations required by a given test feedback as to which test is proceeding shall be displayed. The text shall appear in the same region as the information text box but be displayed with different attributes. In general, results will consist of test output from actual test data, nominal (expected) values, amount of deviation from expected and acceptable limits displayed in either tabular or graphical form. If more than one data display is required for any test, the user will have the option of moving between the different displays without having to repeat the test. A run all tests option will be provided. If this option is selected, all the tests will be run in sequence. The user shall have the option of aborting the sequence after any test.

IMAGE FILE

The utility shall accept one command line parameter: filename. If no file name is specified, the default file name "f:kespr.img" shall be used (FIG. 12). The user is then presented with the opportunity to alter the file name. Once the filename is accepted, the utility shall look for the file. If the file is not found, the program will display the message File Not Found! for three seconds, after which the user shall be given a second opportunity to edit the file name. If after this edit, the file is not found the program shall display the File Not Found! message with the prompt Press <Esc> Key To Abort (FIG. 13). After the user presses <Esc> the program shall terminate. If the image file is located, the file type (KESPR image file) is verified. A valid file is one where the file size corresponds to one of the known image sizes with a header, without a header, with a header and trailer, or just a trailer. If the file is deemed of the wrong type the message File Not A KESPR Image File!! is displayed with the prompt Press <Esc>Key To Abort as per file not found.

TARGET POSITION (FIGS. 14-17)

Once the file name has entered and the file has been found to exist, the test target positioning within the image shall be determined. The X and Y position of three corner points on the target shall be located. These points shall be displayed in tabular form. The target tilt relative to the image shall then be calculated and displayed in tabular form. If the tilt is greater than (TBD) the message Target Too Tilted, Re-Expose and Re-Scan shall be displayed with the prompt Press <Esc> Key To Abort. Otherwise, the message Target Tilt Acceptable shall be displayed.

Expected Values and Acceptable Limits

For all data obtained from analysis of the test target image, there shall be defined expected values and/or maximum and minimum limits. There shall be global variables of the proper data type for each test which shall be initialized to default values defined within the header file kespr.h. These values may be machine and test target specific. Therefore, at startup that program shall attempt to open the file, o_jqual.cfg, located in the kesprdat directory, which will contain values tailored to the individual machine. If this file is not found in the kesprdat directory, the program will look in the current directory. If the file is found, the values contained in the file will replace the defaults, otherwise a message stating that default values are being used shall be displayed to the user. The default data is stored as ASCII data so that a trained user may change items using a standard text editor. The format of the files shall be: '∧' followed by the item number (text next to the item number identifying the data) followed by a '~', the data (separated by spaces), then another '~'. This sequence shall be repeated for each item.

Hard Copy Test Results

Figure 31:
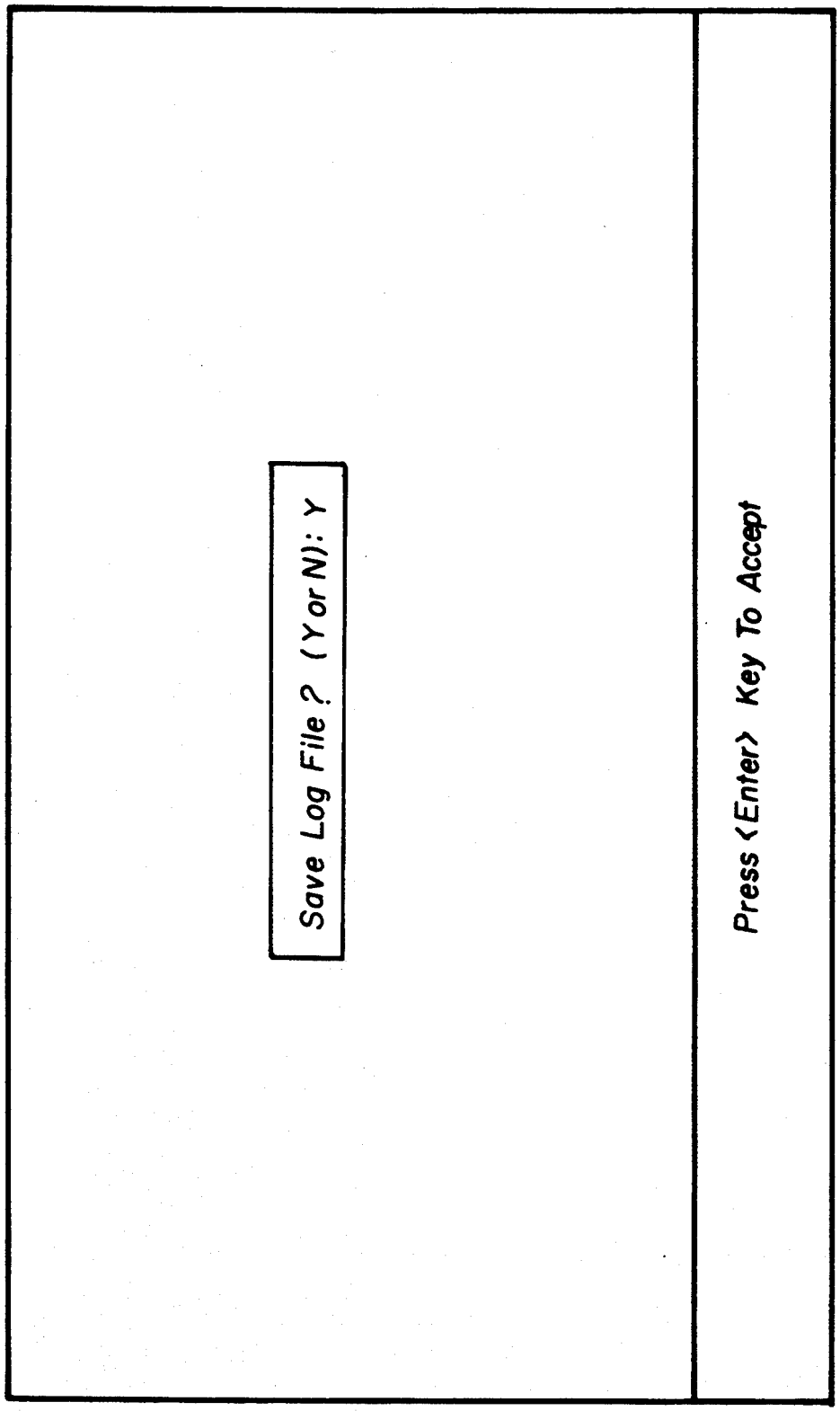

Test data results shall be saved in one of two ways: a text file for tabular data and TIFF [Ref (4)] files for graph data plots. (FIG. 31.)

TABULAR DATA

The text file shall be named obj-cfg.l##  where ## is the first available index number. Older data files have smaller index numbers. The file shall have a header which shall identify the contents of the file as image quality data, the KESPR 'K number', the time and date the target image was obtained and the version of software which created the file. The data shall appear in tables exactly as it appeared on the video monitor during the test. The target corner points and tilt angles shall always be written to the data file. All other tables shall be saved at the users discretion and only once per test run (A given test may be run multiple times within one session). Since some data shall be saved automatically, the user shall be given the option of deleting the log file at the end of the session.

GRAPH DATA

There shall be one TIFF file created for each plot saved. This format was selected because of the number of utilities that exist which display TIFF files. The files shall be named according to the test data they contain. The names shall be expo_l##.tif for exposure to linearity plots, @band_##.tif for banding plots, and elec_##.tif for electronic S/N plots where ## is the first available index and @ is 'f' (fast scan) or 's' (slow_scan). At the bottom of each image the KESPR 'K number', target scan time, scan data and software version number shall be displayed.

Functional Description

MAIN MENU/TEST SELECTION

The main screen will be comprised of a bounce bar menu listing the available tests, a data input window for extra data required by some tests such as the KVP or mAs, and a information/help window. Test selection will be made by moving the highlight bar (bounce bar) using the up and down arrows until the desired test is highlighted and hitting the <Enter> key. If an analysis tool which requires additional information (user input) is selected, the user shall be presented with the data entry window. This window shall identify the data input that is required and display the current value of the input variable which the user can edit/change. The valid edit keys shall be: delete, backspace, left arrow, and Enter. At each stage, text which provides the user with available options will be displayed in the information window.

IMAGE DATA INPUT

Test data shall enter the utility one of two ways: data read from the image file created by a KESPR scan and keyboard input from the user. There will be two functional groups handling data input from the image file, those concerned with initialization and opening and closing the data stream and those concerned with reading a line (variable length) of image data. Each group shall use standard C file access functions. Initialization of image width, height and exposure information shall use data stored within the KESPR image file header (exposure information is entered via the Densei handheld barcode reader), if it exists, or global defaults contained in the C header file kespr.h.

DISPLAY TABULAR DATA

In many cases, data output will be best visualized in tabular form. Therefore, there shall be a function which shall create a row x column which can be filled by rows or by columns. Title, row and column text shall be displayed. The width of the columns shall be decided by the width of the largest column text. Information on the table shall pass to the functions through a global structure table_data. The function shall be able to accept data of any standard C type: char, unsigned char and strings, int, unsigned int, long, unsigned long, float and double.

GRAPH/PLOT DATA

All graphs shall be displayed using IBM VGA mode 12 h which has 640×480 pixel resolution and 16 simultaneous colors. All information pertaining to a given plot shall be passed through a global data structure. There shall be two functional groups related to graphing data: one to set up the graph and one to plot the data. The graph shall have axes draw so as to enclose the entire plot area. Axis tick marks shall be present on all four sides and shall be connected across. Only the left Y axis and lower X axis shall have tick labels according to the maximum and minimum values for each axis as set in the data structure and axis label describing. There shall be provisions for a graph/plot title. The data plotting function shall handle at least six data sets. Each data set shall have a point marker (dot, X, triangle, circle or square), a point connection type (none, connected or best fit line) and a color. Other plot options shall include error bars which shall be defined by a delta (±value) and a legend which shall display the data set marker in the appropriate color and legend text.

Advantageous Effect

The automated method finds application in the analysis of the photometric calibration and image quality performance characteristics of a storage phosphor reader. The method yields a comprehensive and reliable assessment of the reader performance and is compatible for use in field (hospital) and manufacturing environments.

Although the invention has been described with reference to preferred embodiments thereof, it will be understood that variations and modifications can be effected within the spirit and scope of the invention as described above and as defined in the appended claims.

What is claimed is:

1. An automated method for analyzing the photometric calibration and image quality performance characteristics of a storage phosphor reader comprising the steps of:

exposing to x-rays a storage phosphor through a lead mask test target having a plurality of calibrated density regions useful in analyzing x-ray image characteristics and storage phosphor reader characteristics;

reading said exposed storage phosphor by means of a storage phosphor reader to be calibrated, to produce a digital test target image; and digitally processing said digital test target image to produce analytical results of preselected x-ray image characteristics and storage phosphor reader characteristics.

2. The method of claim 1 wherein in said exposing step, said lead mask test target has calibrated density regions useful in analyzing one or more of the following x-ray image characteristics and/or storage phosphor reader characteristics, i.e., exposure latitude and linearity, electronic signal-to-noise ratio, spatial resolution, geometric linearity of the reader, artifacts due to mechanical vibration of the reader, artifacts due to electronic noise, and flare light artifacts and wherein said digital processing of said digital test target image produces analytical results of said one or more characteristics.

3. The method of claim 1 including the step of displaying said analytical results produced by said digitally processing step on a video monitor to apprise a viewer of said preselected characteristics.

4. The method of claim 3 wherein said analytical results are displayed on said video monitor in a tabular format and/or a graphical format.

5. The method of claim 1 wherein in said exposing step, said lead mask test target includes a composite of layers of lead mask regions, wherein stacked lead mask regions provide different densities to x-rays.

6. The method of claim 5 wherein each layer of lead mask regions of said lead mask target has a uniform thickness which is the same for each layer.

7. The method of claim 1 wherein said exposing step is carried out by an x-ray generator, which is set at fixed operating parameters including, distance from x-ray generator to storage phosphor, x-ray generator peak voltage setting and total integrated current flow, and x-ray beam filtration.

8. The method of claim 1 wherein said exposing step includes the step of measuring the x-ray beam energy at the storage phosphor plane, and storing the measured value for use in said step of digitally processing said digital test target image.

9. The method of claim 8 wherein said step of measuring the x-ray beam energy is done with a calibrated x-ray photodetector which includes a photosensor and a phosphor covering the photosensor, said phosphor converting x-ray energy into light energy sensed by said photosensor.

10. The method of claim 1 wherein in said exposing step said lead mask target includes precisely located corner points, and wherein in said digitally processing step, the location of said corner points is established and the tilt of the test target is determined to be within or without predetermined limits.

11. The method of claim 10 wherein in said digitally processing step, said corner points are located by an edge detection algorithm.

12. The method of claim 11 wherein said edge detection algorithm is a differential contrast edge detection algorithm.

13. The method of claim 1 wherein in said exposing step, said lead mask target includes a plurality of different step wedge regions having graded lead thicknesses representing image tone scale gradations, and wherein in said digitally processing step, exposure latitude of each read tone scale region is determined by measuring the average value and variance thereof.

14. The method of claim 13 wherein after said exposure latitude is determined for each of said tone scale regions, the signal to noise ratio(SNR) is determined for each said tone scale region.

15. The method of claim 14 wherein said SNR is determined by measuring the standard deviation over a substantial number of pixel locations in each of said tone scale regions.

16. The method of claim 1 wherein in said exposing step, said lead mask target includes at least one set of line resolution bar regions in each of two orthogonal directions on said target, and wherein in said digitally processing step, the spatial resolution is determined in each of said directions from said line resolution regions.

17. The method of claim 1 wherein in said exposing step, said lead mask target includes alternating regions of high density and low density along orthogonal directions on said target, and wherein in said digitally processing step, the geometric scan linearity in said orthogonal directions is determined from measurement of the distance between said alternating regions of high density and low density.

18. The method of claim 1 wherein in said exposing step, said lead mask target includes a region of low density for determining banding noise power, and wherein in said digitally processing step, the banding noise power is determined using Fast Fourier Transform.

19. The method of claim 1 wherein in said exposing step, said lead mask target includes a region of high density for determining electronic noise, and wherein in said digitally processing step, the electronic noise is determined using Fast Fourier Transform.

20. The method of claim 1 wherein in said exposing step, said lead mask target includes regions of low and high density for determining flare, and wherein in said digitally processing step, the flare is determined by measuring the ratio of the dark signal average to the bright signal average.

* * * * *